(12) United States Patent
Rousselle et al.

(10) Patent No.: US 7,212,670 B1
(45) Date of Patent: May 1, 2007

(54) METHOD OF FEATURE IDENTIFICATION AND ANALYSIS

(75) Inventors: Adam Rousselle, Doylestown, PA (US);
Vesa Leppanen, Chalfont, PA (US);
David McCrystal, Chalfont, PA (US);
Olavi Kelle, Doylestown, PA (US);
Robert Pliszka, Sellersville, PA (US)

(73) Assignee: ImageTree Corp., Morgantown, WV (US)

( * ) Notice: Subject to any disclaimer, the term of this patent is extended or adjusted under 35 U.S.C. 154(b) by 599 days.

(21) Appl. No.: 10/139,001

(22) Filed: May 3, 2002

(51) Int. Cl.
*G06K 9/34* (2006.01)
(52) U.S. Cl. ..................................... 382/173
(58) Field of Classification Search ..................... None
See application file for complete search history.

(56) References Cited

U.S. PATENT DOCUMENTS

| | | | |
|---|---|---|---|
| 3,978,324 A | 8/1976 | Rayner | |
| 4,495,500 A | 1/1985 | Vickers | |
| 5,113,451 A * | 5/1992 | Chapman et al. | 382/145 |
| 5,303,310 A * | 4/1994 | Grove | 382/109 |
| 5,335,181 A | 8/1994 | McGuffin | |
| 5,467,271 A | 11/1995 | Abel et al. | |
| 5,510,798 A | 4/1996 | Bauer | |
| 5,552,787 A | 9/1996 | Schuler et al. | |
| 5,566,069 A | 10/1996 | Clark, Jr. et al. | |
| 5,596,494 A | 1/1997 | Kuo | |
| 5,668,719 A | 9/1997 | Bobrov et al. | |
| 5,751,852 A | 5/1998 | Marimont et al. | |
| 5,845,229 A | 12/1998 | Rawlins | |
| 5,857,030 A | 1/1999 | Gaborski et al. | |
| 5,859,891 A | 1/1999 | Hibbard | |
| 5,886,662 A | 3/1999 | Johnson | |
| 5,982,707 A | 11/1999 | Abbott | |
| 5,999,650 A | 12/1999 | Ligon | |
| 6,002,984 A | 12/1999 | Aughenbaugh | |
| 6,119,531 A | 9/2000 | Wendte et al. | |
| 6,130,639 A | 10/2000 | Agnesina et al. | |
| 6,356,646 B1 * | 3/2002 | Spencer | 382/103 |
| 6,525,319 B2 * | 2/2003 | Meglen et al. | 250/339.05 |
| 6,640,010 B2 * | 10/2003 | Seeger et al. | 382/229 |
| 6,651,008 B1 * | 11/2003 | Vaisberg et al. | 702/21 |
| 6,768,820 B1 * | 7/2004 | Yakhini et al. | 382/289 |
| 6,873,998 B1 * | 3/2005 | Dorum et al. | 707/104.1 |
| 2002/0085001 A1 * | 7/2002 | Taylor | 345/440 |
| 2002/0087260 A1 * | 7/2002 | Hancock et al. | 701/200 |

(Continued)

OTHER PUBLICATIONS

Markus Torma, Juha Hyyppa, "Estimation of Tree Species Proportions of Forest Compartments using Ranging Scatterometer" □□IEEE publication.*

(Continued)

*Primary Examiner*—Joseph Mancuso
*Assistant Examiner*—Alex Liew
(74) *Attorney, Agent, or Firm*—Spilman Thomas & Battle PLLC

(57) ABSTRACT

A method for efficiently and accurately inventorying image features such as timber, including steps of segmenting digital images into tree stands, segmenting tree stands into tree crowns, each tree crown having a tree crown area, classifying tree crowns based on species, and analyzing the tree crown classification to determine information about the individual tree crowns and aggregate tree stands. The tree crown area is used to determine physical information such as tree diameter breast height, tree stem volume and tree height. The tree crown area is also used to determine the value of timber in tree stands and parcels of land using tree stem volume and market price of timber per species.

39 Claims, 16 Drawing Sheets

Image Processing

U.S. PATENT DOCUMENTS

2002/0107644 A1* 8/2002 Meglen et al. ............... 702/30
2003/0002737 A1* 1/2003 Bankman et al. ........... 382/173
2004/0101204 A1* 5/2004 King .......................... 382/243

OTHER PUBLICATIONS

Juha Hyyppa, "Feasibility for Estimation of Single Tree Characteristics using Laser Scanner" IEEE publication.*

M. Paterson, R. M. Lucas, L. Chisholm "Differentiation of Selected Australian Woodland Species Using CASI Data" IEEE publication.*

Hill, D.A. et al., "Automated Interpretation of High Spatial Resolution Digital Imagery for Forestry", International Forum Feb. 10-12, 1998, Pacific Forestry Centre, Victoria, British Columbia.

Gourgeon, Francois A., et al., "Individual Tree Crown Image Analysis—A Step Towards Precision Forestry", First International Precision Forestry Symposium, Jun. 17-20, 2001, Seattle, Washington.

Hyyppa, Juha, et al., "A segmentation-based method to retrieve stem volume estimates from 3-dimensional tree height models produced by laser scanner".

* cited by examiner

Tree Crown Delineation

METHOD OF FEATURE IDENTIFICATION AND ANALYSIS

A portion of the disclosure recited in the specification contains material which is subject to copyright protection. This application includes a compact disk appendix containing source code listings that list instructions for a process by which the present invention may be practiced in a computer system. Two identical copies of the source code listing, file name "Carbo," 7.10 MB, are provided on compact disks created on May 2, 2002. The copyright owner has no objection to the facsimile reproduction of the specification as filed in the Patent and Trademark Office. Otherwise all copyright rights are reserved.

FIELD OF THE INVENTION

The present invention relates to a method for natural resource management. More specifically, this invention relates to a method of identifying and analyzing digital images to extract, classify, and analyze aggregate and individual features. More specifically, this invention relates to a method of identifying, classifying and analyzing digital images of timber containing areas, segmenting stands of timber from these timberlands, and classifying and analyzing individual stands to produce a timber inventory.

BACKGROUND OF THE INVENTION

Feature identification and classification from aerial and satellite images have become increasingly valuable sources of information for natural resource management, and are useful in both public and private sectors for conservation and crop planning practices. However, current systems of forest inventorying are unsatisfactory, as they may be labor intensive, subject to substantial human error, or both.

Forest inventorying and analysis require the location and identification of valuable timber, typically present in stands of trees spread over large and geographically diverse areas. Current methods of locating and identifying timber include making field observations and measurements of individual trees, manually reviewing aerial photographs and satellite images, and automated or computer driven reviewing of digital aerial photographs and images. Field observation by professional foresters is both costly, labor-intensive, and slow, as it involves walking the forests and measuring the trees by hand. For example, up to 75% of a typical Appalachian region hardwood sawmill forestry staffs time may be spent looking for valuable timber. However, this labor-intensive search for timber usually meets only 70% of the sawmill's timber requirements. The remainder of the timber is then usually purchased in a closed bid auction. Accordingly, the sawmill thus incurs both the skilled labor costs involved with the manual location of timber, and premiums added to the cost of the timber purchased in the closed bid process, which can range from 30% to 100% of the timber's uncut fair market value. Tree measurements obtained by this method may also be substantially inaccurate because a forester cannot economically measure every tree or visit all parts of the tree stand measured. Rather, the forester will typically rely on sampling: measuring sample plots and generalizing the results to the whole stand, and then to the whole forest. This method is particularly subject to error in locating the more valuable tree stands, given the errors inherent in geographical sampling methods. Field measurement work is affected by the diverse methods that individual foresters use to make the measurements, as well as by the forester's exposure to adverse conditions such as weather changes and inhospitable terrain. These factors, among others, substantially affect the accuracy of timber inventories obtained by field observation methods.

Similarly, manual review of aerial photographs or images of a forest canopy, where comparisons to sample plots are sometimes used, also involves a time intensive review by a staff of skilled foresters. These methods are both inefficient and typically require a staff of foresters who are highly skilled in image interpretation. Moreover, variance in the level of experience and skill of the forester performing the review makes the analysis subject to human error and bias, and the accuracy of timber inventories obtained by this method is limited at best. Concurrent ground-truthing as a form of field observation to confirm or support the forester's analysis is often required, and even so, errors may lead to inaccuracies in tree count, stand location and composition, such that a less than satisfactory inventory is produced, whether for purchasing the timber, inventorying current timber, or conservation/ecological preservation of public and private lands.

Additionally, current systems and methods for automated digital image classification and analysis, when applied to images of forest canopies, such as tree stand and tree crown delineation, are also inaccurate or produce incomplete inventories. Typical algorithm based methods that rely on pixel color classification of imagery use only low-resolution imagery, and are accordingly inaccurate and incomplete at the stand level. Although pixel classification of satellite imagery may be used for forest inventories and estimating forest attributes, these are mainly appropriate only for large-scale forests, on the order of 100 hectares or more, and accordingly these methods fail to obtain accurate location or ownership information regarding the imaged forested areas. See Juha Hyyppa, et al., "A segmentation-based method to retrieve stem volume estimates from 3-dimensional tree height models produced by laser scanner," Finnish Geodetic Institute, Department of Phogrammetry and Remote Sensing, MASALA, Finland. Moreover, typical methods using pixel classification for timber measurements at the stand-level is often unreliable and subject to error because the image resolution does not permit single tree measurements or accurately discern individual tree crown areas, i.e. the inventories obtained erroneously cluster small trees of limited total value may be erroneously classified as one large tree of substantial value.

Still other methods have been applied to high pulse-rate laser scans taken from aerial platforms, however current systems typically are only able to partially capture the physical dimensions of the trees captured. See Hyyppa, et al. High pulse-rate laser scanners digitally record the height of the tree canopy, enabling estimation of tree crown area. However, these images are in only a single narrow band or channel, have only grayscale values, and provide only estimates of tree crown area. Even when at high resolution, the computerized methods applied to these images are unable to accurately classify trees as to species, and species classifications would thus require ground truthing in order to provide accurate timber inventories. Accordingly, without tree species classification, there is a significant deficiency in the amount of information generated about the tree stand and forested region, and the value of the inventory to a potential land use planner, sawmill operator or land owner is significantly decreased.

Additional automated methods of image analysis that use rule-based processes to outline object boundaries have also been employed to determine the location of individual tree crowns based on small indentations in tree cluster boundaries, or identify and regroup segments of crown into single crowns. However, these methods only estimate the location of trees and estimate the area of tree crowns, and thus are not as accurate as actual identification of tree crowns. See Francois A. Gougeon and Donald G. Leckie, "Individual Tree Crown Image Analysis—A Step Towards Precision Forestry," presented at the First Int. Precision Forestry Symposium, Seattle, Wash., USA (Jun. 17–20, 2001). For example, these methods typically only partially form polygons or boundaries around each tree crown, and estimate the remainder of the boundary using a flooding model methodology. "Comparison of Two Tree Apex Delineation Techniques," *International Forum Automated Interpretation of High Spatial Resolution Digital Imagery for Forestry, Pacific Forestry Centre, Victoria, British Columbia, Canada*, pp. 93–104 (Feb. 10–12, 1998). Gougeon and Leckie have also described the valley following technique, which is used to delineate trees, but it has heretofore required a high degree of separation (e.g. shaded area) between individual trees in the tree stand in order to delineate individual trees. See Gougeon and Leckie (2001).

Moreover, none of the aforementioned automated or manual reviewing methods provides an efficient and accurate inventory that includes the actual economic value of the timberland being inventoried by taking into account the varying market value for trees of varying sizes and species, nor do they provide information on the ownership of the timberland being imaged and analyzed. Thus, there is a need in the art to provide a method for inventorying timberlands efficiently and accurately which provides valuation information such as the stem volume, size, species, location and ownership of particular tree stands and forests.

SUMMARY

The present invention provides a method of efficiently and accurately identifying and analyzing features from digital images. According to one embodiment, the present invention provides a method of efficiently and accurately inventorying timberlands to provide valuation information essential to land use planners, sawmills, land owners, and others having economic or environmental interests in a given parcel of timber. The invention includes analyzing a digital image to generate data and economic value information about timber, on the tree stand level, and on the individual tree level. One embodiment of the invention includes segmenting a stand from a digital image, segmenting a tree crown area from the stand, applying one or more models to the tree crown area to determine the Diameter Breast Height (DBH) of the tree corresponding to the tree crown, optionally identifying the species of the tree, and generating an inventory of valuation information about the stands of trees.

In one embodiment of the invention, a computer assisted method includes segmenting tree stands from a digital image using an unsupervised algorithm to produce stand segmentation polygons, segmenting a portion of the digital image encompassed stand segmentation polygons to produce tree crown polygons, classifying the trees crowns based on one or more attributes discerned from the digital image, and analyzing the tree crown areas to produce a tree stand inventory.

In one embodiment of the invention, segmenting tree stands from digital images includes segmenting a digital image to produce a tree stand polygon image using an unsupervised segmentation algorithm, outputting the tree stand polygon as a polygon image (video display or printed), comparing said polygon image to the digital image, and optionally adjusting said unsupervised segmentation algorithm so that the tree crown polygons correspond to the objects shown in the digital image. In one embodiment of the invention, segmenting the tree stands includes merging polygons by manually selecting portions of polygons to be removed.

In one embodiment of the invention, the step of segmenting the tree crowns also includes an optional step of adjusting the segmentation algorithm.

In one embodiment of the invention, the step of classifying tree crowns utilizes supervised classification to determine tree species. In one embodiment, the species of one to five trees is identified by the user from the digital image, and a training algorithm identifies the remaining trees in the stand, and storing the tree species data thus obtained in the searchable database.

In one embodiment of the invention, tree crowns are analyzed by applying models which relate tree species data to tree crown polygon area, and the data is stored in a searchable database, e.g. as a vector file attribute. In one embodiment, the total stem volume in a given stand for a range of trees having a given DBH, species or both is determined. In one embodiment of the invention, the vector file locations can be overlaid by stand onto a geo-coded map or a map coordinate system and integrated with tax, soil, and slope overlays about the same piece of property to provide a complete data set of physical, geographical, statistical and valuation information about the particular forested area.

DETAILED DESCRIPTION OF THE INVENTION

The present invention relates to a method of accurately and efficiently classifying and analyzing a digital image that depicts forests and stands of trees. The trees represent individual features or objects depicted by the digital image, that comprise tree stands, which in turn are aggregate objects or features in the digital image. Examples of other individual features which are typically captured by digital images include, but are not limited to, single or small groupings of plants, trees or small groups of homogenous trees, a house, road or building or, in the case of a digital microscopic image, a vessel, cell or small number of cells. Aggregate features are comprised of large numbers of individual features, homogeneous or heterogeneous. Examples of aggregate features include, but are not limited to, a crops, marshlands, forests, and stands of trees.

Figure 1:
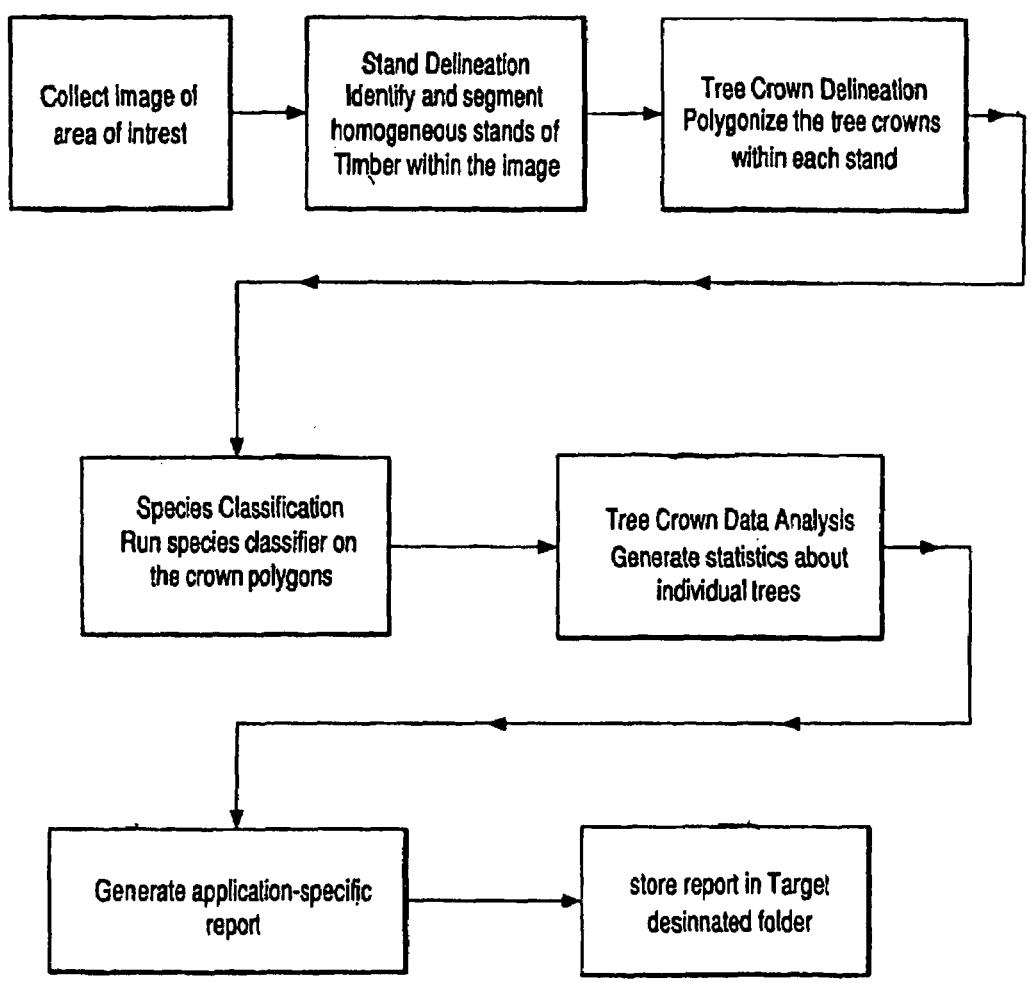
FIG. 1 is a schematic diagram illustrating the steps of the present invention.

According to one aspect of the present invention, the method is performed using a computer system, e.g. a processor, storage media, input device, and video display in operable connection. Referring now to FIG. 1 illustrating one embodiment of the present invention, a digital image is taken of an area 10 comprised of a number of individual features, e.g. trees, roads, or buildings, and aggregate features, e.g. stands of trees and forests, and the invention relates to a method of accurately and efficiently inventorying the timber depicted by the image. The example includes segmenting forests into separate tree stands 30, segmenting the tree stands into separate tree crowns 50, and classifying the trees depicted in the digital image and segmented from the tree stands 60, analyzing the tree stand crown polygons to determine the crown area of the trees 70, and generating an accurate inventory of the tree stands and forests, comprised of the location, attribute data and valuation information produced by the preceding steps of the method 80. Optionally, the inventory can be stored in a designated vector file or other computer storage means 90.

The aggregate features of the digital image are separated into relatively homogeneous parts using a segmentation algorithm. In particular, a digital image of a portion of a forest, which typically depicts one or more species of trees of varying sizes, is segmented into stands of trees, which are preferably more homogeneous in composition than the forest itself. The stands are themselves segmented into polygons which encompass individual trees depicted in the portion of the digital image encompassed by the stand segment, such that the individual crowns of the trees are delineated by the polygons. The trees are then analyzed based on their crown area, classified by species or form model, or both, and using publicly obtainable forestry data and ratios to determine the tree's DBH and stem volume for each tree of a given species. The results of the classification and analysis are then compiled and saved in a searchable database, e.g. a vector file, such that a user of the system can determine the total stem volume for species of tree, or for trees of a range of DBH, or both, i.e. the total stem volume for a species of tree, including only trees of a certain minimal DBH, and optionally containing an accurate identification of the location and ownership of the trees, which is publicly available in tax parcel maps though difficult to obtain ordinarily. This information is particularly useful in the field of forestry, as it directly relates to the age of the forest, the health of the forest, and economic value of the trees contained in the forest, particularly since the location of the economically valuable trees is also identified.

Typical digital images for use in this invention are taken from aerial platforms or satellites and are either stored digitally when taken or transferred into digital format. As such, the input images contain digital numbers associated with pixels on the image. Typical sources for digital images digital or film cameras or spectrometers carried by aircraft or satellite. At least visible color channels and infrared bandwidths can be used. Optionally, high pulse rate laser scanner data is used in combination with digital imagery. Digital input imagery is preferably of a resolution of 1 meter, more preferably 0.5 meter. Preferably, input images are orthorectified to a geo-coded map and color balanced.

High Level Segmentation

Figure 2:
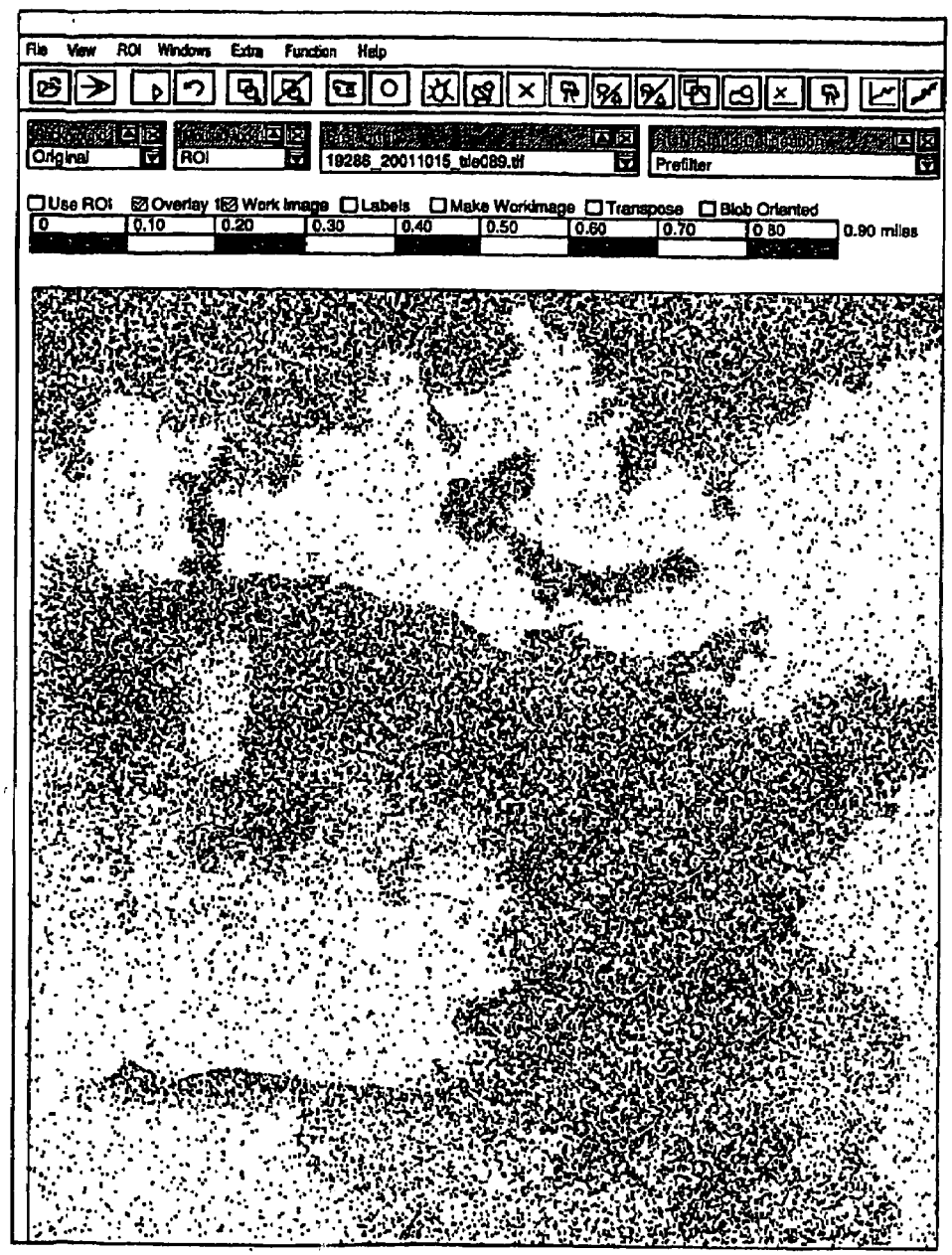
FIG. 2 is a digitized input image with a 2–4 meter/pixel resolution illustrating a 12 square mile forested area in Nicholas County, West Virginia.
Figure 3:
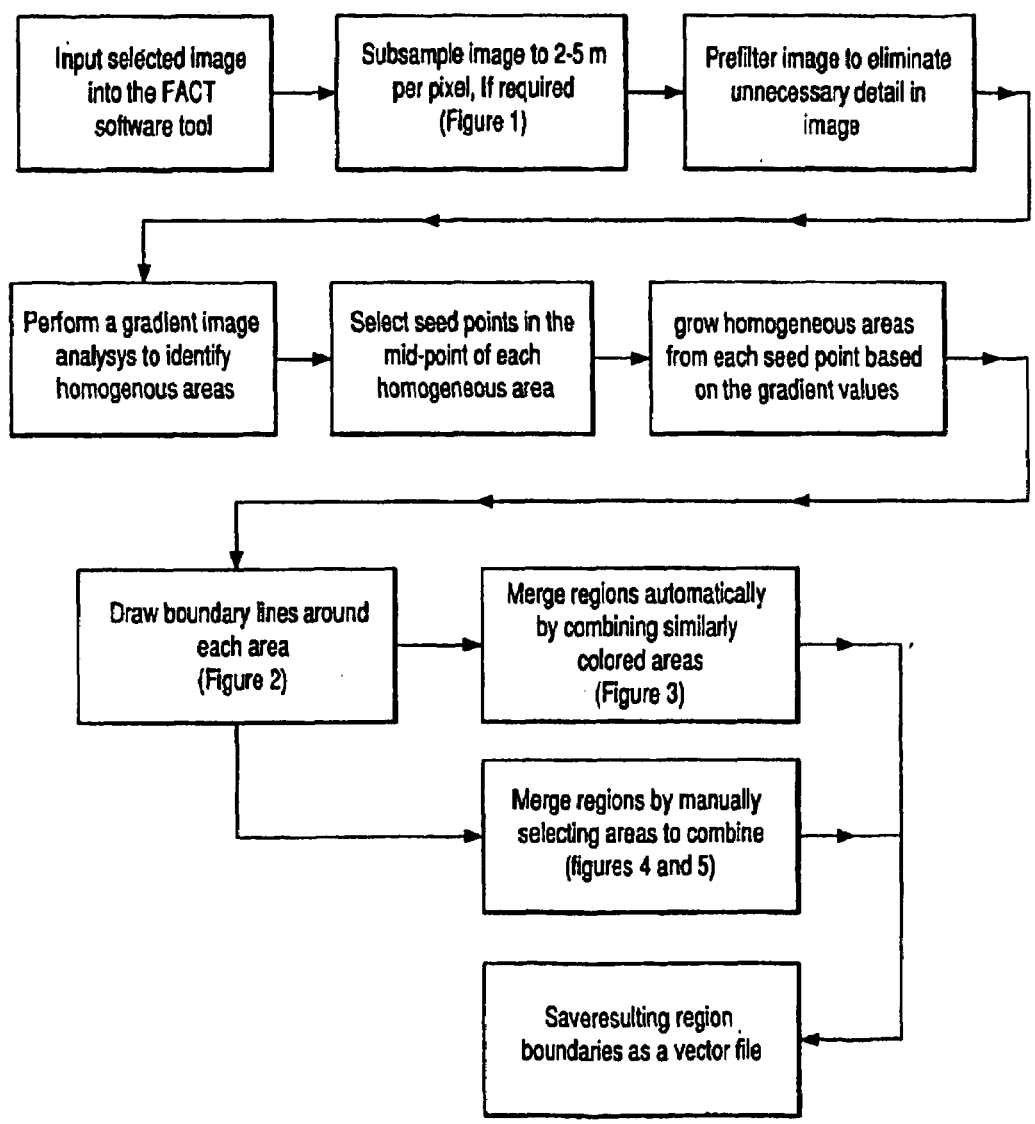
FIG. 3 is a flow chart of the step of high level segmentation of tree stands from a digital input image.

According to one aspect of the current invention, segmentation by a seeded region growing method is performed to obtain a segmentation vector file of polygon boundaries for homogenous areas within the digital image, e.g. tree stands. Referring now to FIG. 3, an digital input image in a computer system is selected 31. As an input, a resolution where single features such as tree crowns cannot be detected is selected in this phase, for example, a 2–5 meter/pixel resolution. The image can be subsampled to reach the required resolution 32. For example, FIG. 2 illustrates a digitized image using a 2–4 meter/pixel resolution. A prefilter may be used to eliminate unwanted details 33. The prefilter value is the size of the discrete gaussian filter mask required to eliminate specific details and is preferably between 0 and 30. If desired, a gradient image analysis is performed to identify homogenous areas within the input image 34. According to one embodiment of the method, gradient image analysis is performed by replacing the digital image with a new image corresponding to the greyscale gradient values of the image. A "seed point" is planted at the center of each region that has similar color/grayscale values 35. The similarity is measured in the gradient image, where a "postfilter" parameter specifies a gradient window size, where a window is the distance between the center and outer pixel that are selected by the algorithm to calculate the gradient. Preferable windows for segmentation of forested regions range from 1 to 30, preferably 15 depending on the resolution of the digital image and the separation of the trees imaged. The pixel with the lowest gradient is assigned the segment's seed point, and a homogenous region is grown from the seed points by adding pixels into the segments in the minimum change direction among all segments in the image. The added pixels must be next to an existing segment in any current phase. Adding pixels is continued until the entire image has been saturated according to the seeded region growing method and all pixels belong to a segment, and pixels at the borders of the segments represent the segment polygons 36. Boundary lines are drawn around the homogenous areas grown 37. Aggregate feature segmentation according to one embodiment is preferably performed on input images of high resolution, 0.4 to 1.5 m/pixel, however, the scope of the invention is not limited to such input images.

Figure 4:
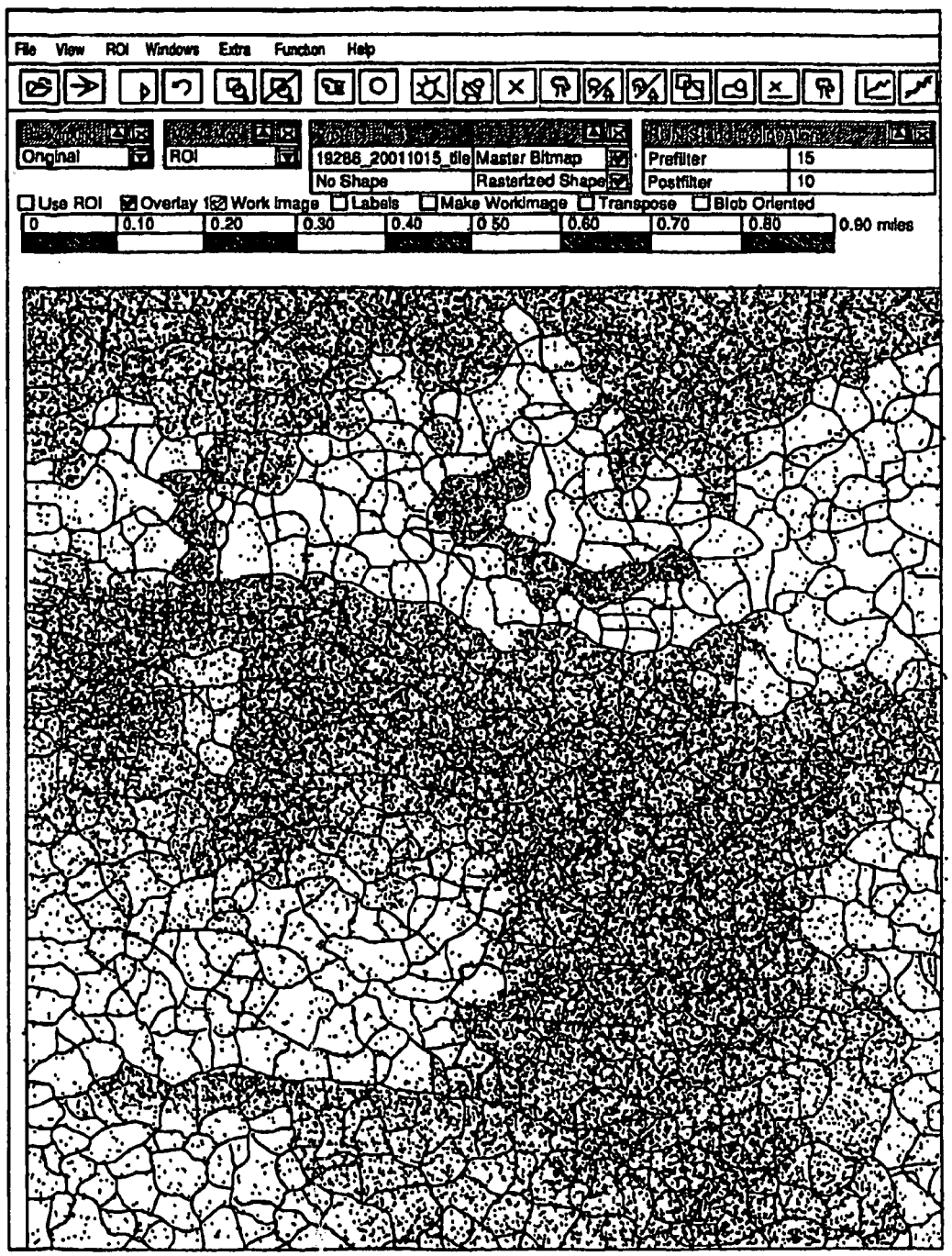
FIG. 4 illustrates an example of a digital image output using a computer video monitor, overlayed with the polygon image produced by the step of high level tree stand segmentation.
Figure 5:
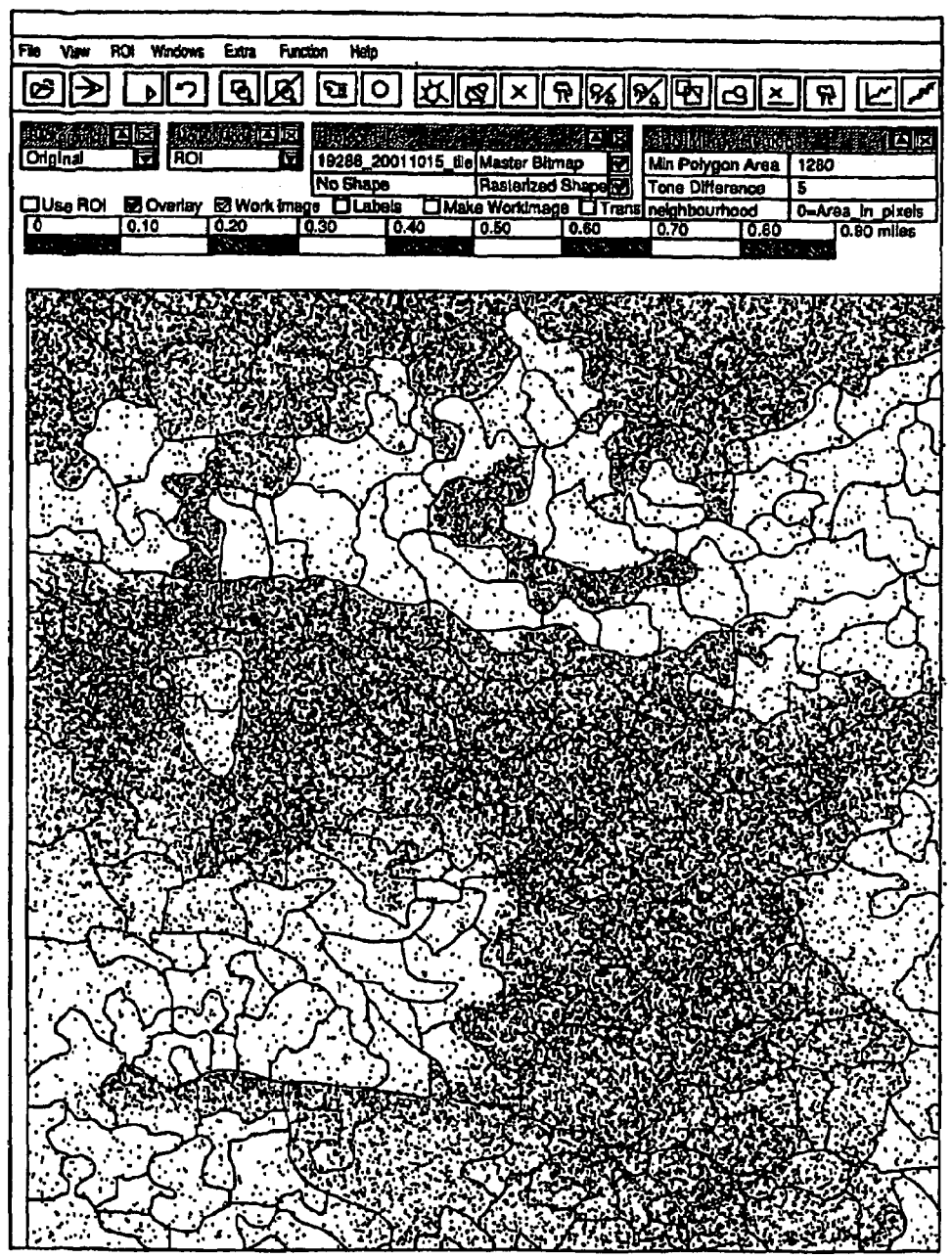
FIG. 5 illustrates the same input image as FIG. 4, after unsupervised stand segmentation adjustment.

Accordingly, segment boundary lines, or polygons, are formed around the homogenous segments which are preferably polygonal in shape, as indicated in FIG. 4. Segmentation as described herein may be carried out using the expressions found in the source code set forth in the appendix, however it is recognized that the scope of the present invention is not limited by the embodiments presented herein.

Where first performed by an automatic or unsupervised algorithm, segmentation may preferably be adjusted using unsupervised and/or manual adjustment of the segmented image file. Referring once again to FIG. 3, automatic unsupervised segmentation adjustment 38 is performed by adjusting the algorithm's filter threshold, which, upon reapplication of the segmentation algorithm, produces an the image as the merging together the neighboring segments of the previous phase, i.e. if their average color or texture feature is similar enough compared to a given threshold value. This phase can be done one or several times until the result is satisfactory. This phase is illustrated on FIG. 5 which shows the result of unsupervised segmentation adjustment performed on the stand delineation in FIG. 4. The step of unsupervised segmentation adjustment in this embodiment is performed by an expression found in the source code set forth in Appendix A. It would be recognized, however, by those skilled in the art that the source code is provided for exemplary purposes and the invention is not limited by the code disclosed herein.

Figure 6:
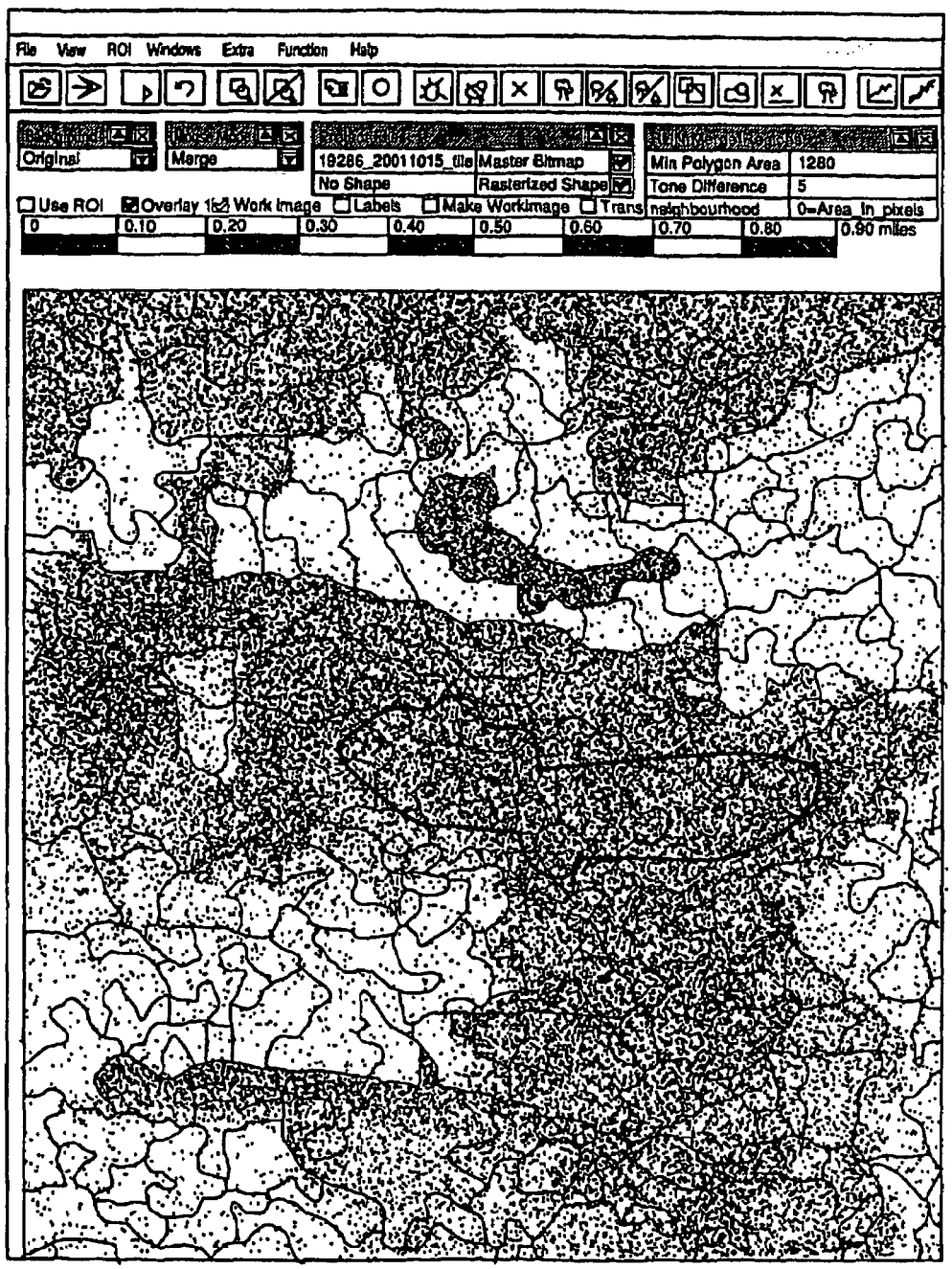
FIG. 6 illustrates manual stand segmentation adjustment by circumscribing a line through tree stand segment polygon borders, such that the portion of the polygon circumscribed is removed from the segmentation image and file.
Figure 7:
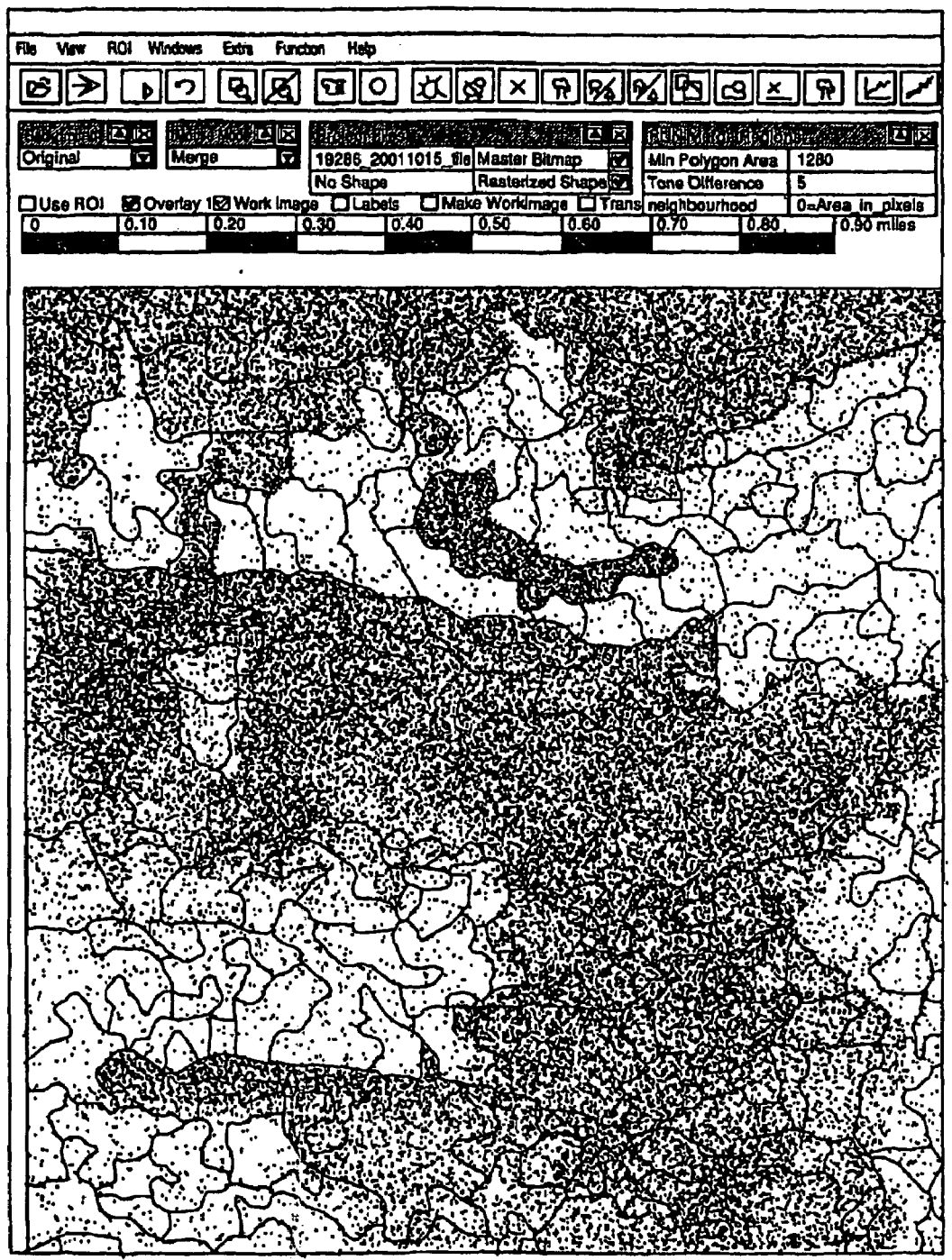
FIG. 7 illustrates the result of manual segmentation adjustment on FIG. 6.

Manual segmentation adjustment 39 is performed by user selection of two or more neighboring segment polygons by drawing a line touching segment polygon borders using a mouse or other computer pointing device. Alternatively, the user drawn line may be connected at the start and end points and all segments that have points common with the line or that lie within the center of the line with connected start and end points will be merged. Manual segmentation adjustment is indicated in FIGS. 6 and 7. FIG. 6 depicts a user drawn line across segment polygon boundaries. FIG. 7 depicts a resulting larger homogenous segment. The manual segmentation function may be performed by the expression found in the source code set forth in the appendix, however it would be recognized by one skilled in the art that the scope of the present invention is not limited to the specific embodiment.

The resulting segmented image file 40 is stored in a vector file and can be displayed as an overlay or layer on the input image using ordinary display means. The segmented boundaries are stored in vector file format, such that the resulting layer can be drawn onto the original input image and/or rectified into any map coordinate system.

According to another embodiment of the present invention, no segmentation is required and a known boundary around an area on an input image is used to further analyze features within the image.

Low Level Segmentation

Figure 8:
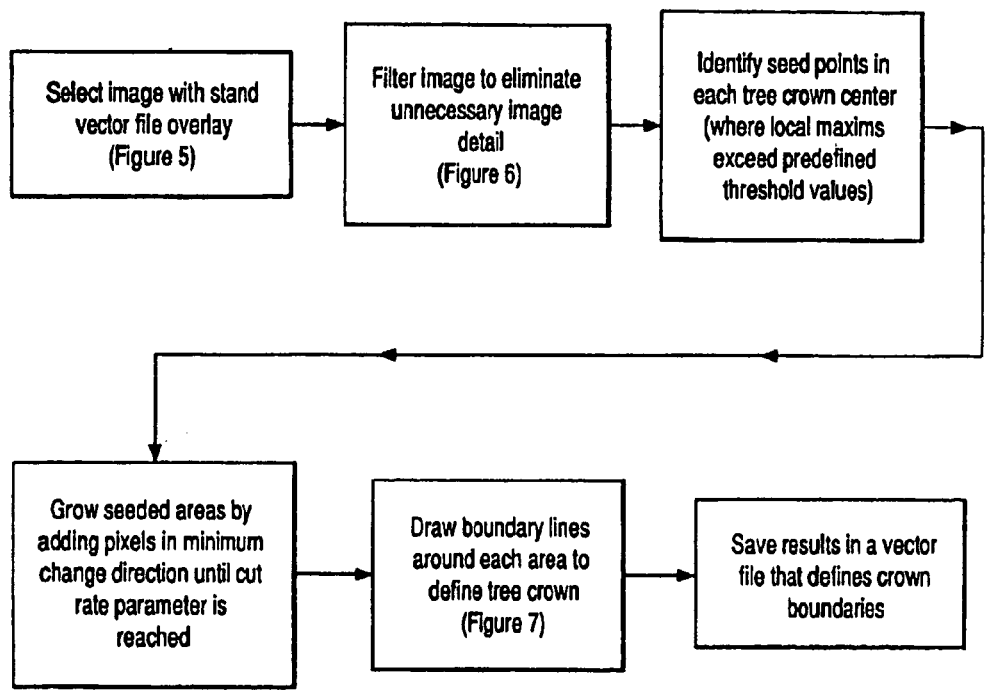
FIG. 8 is a flow chart of low level tree crown segmentation.
Figure 9:
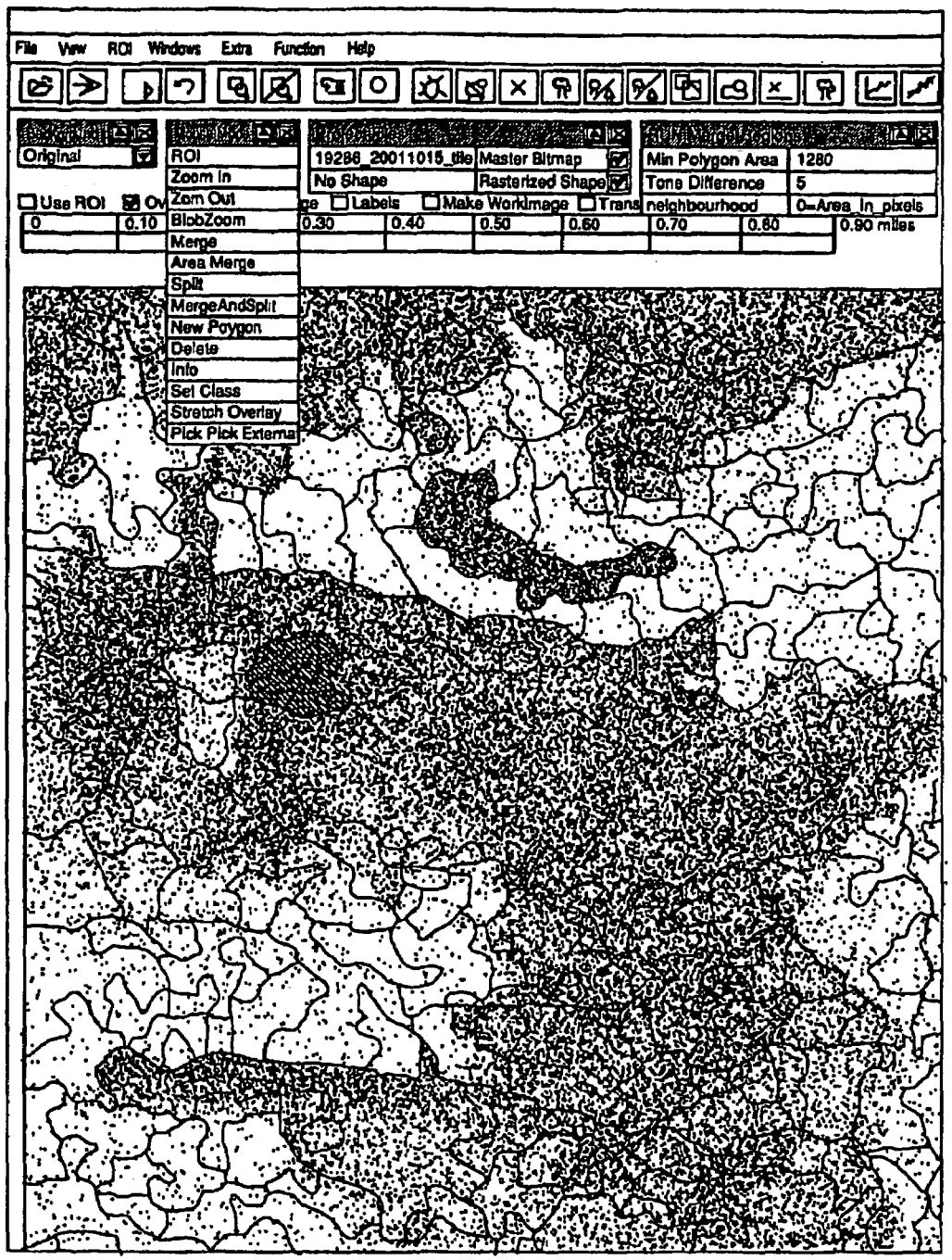
FIG. 9 illustrates user selection of a stand vector file for tree crown delineation, species classification, and data analysis.
Figure 10:
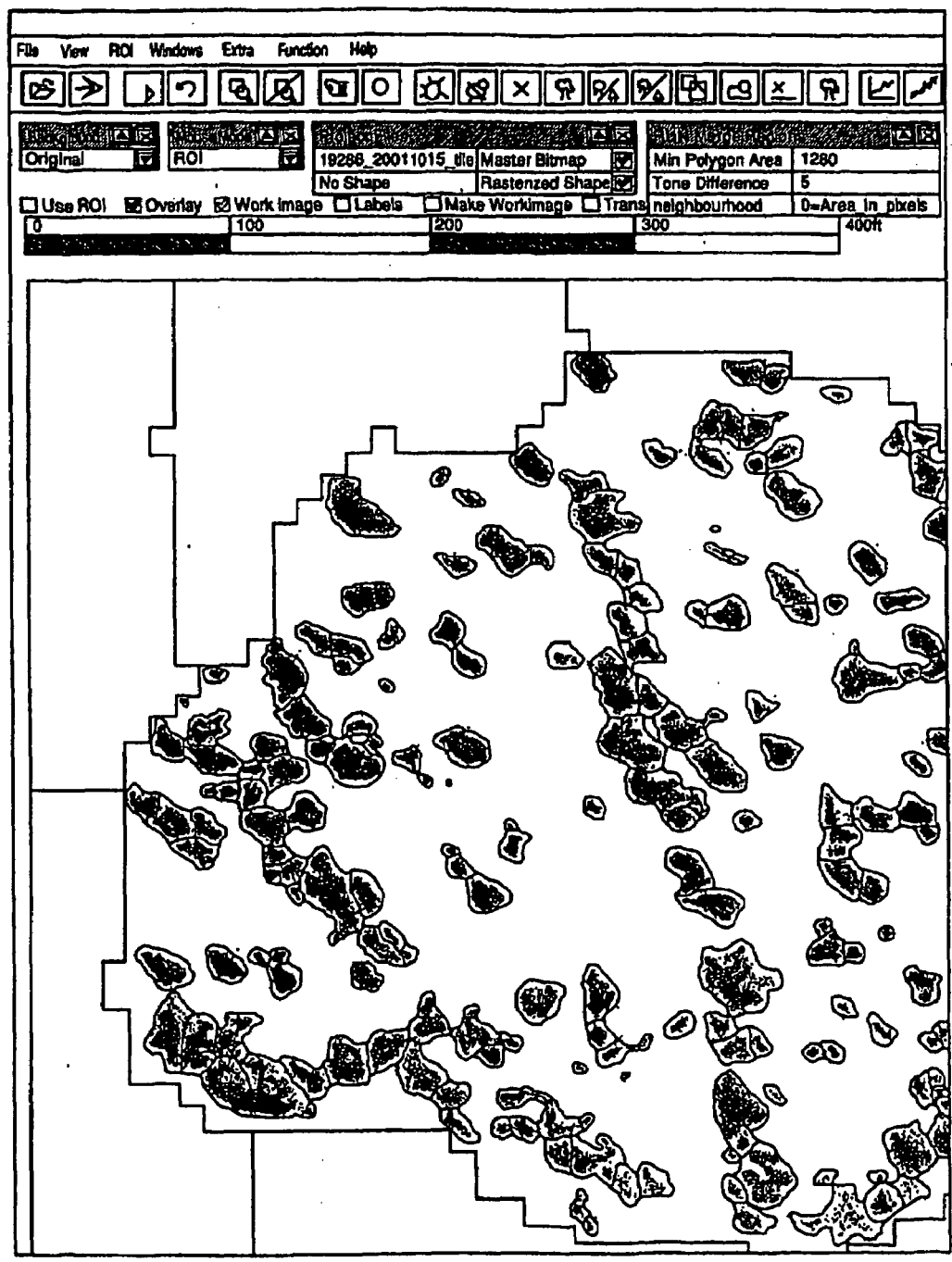
FIG. 10 illustrates the selected stand vector file before low level segmentation.

According to one aspect of the current invention, low level segmentation, or individual feature segmentation is performed on a segment selected from the high level segmentation file. Referring to FIGS. 8 and 9, a stand vector file overlay is selected 51. According to one aspect of the present invention, individual tree crowns are segmented using seeded region growing 54. As illustrated in FIG. 10, within a user selected tree stand, filtering may be necessary if the image is detailed and only analysis of specific tree crowns is desired. Preferably, control parameters are used to delineate only those tree crowns associated with a certain type, species or other parameter. A prefilter may be used to eliminate unwanted details. For example, the red/green/blue (RGB) value of the target color may be used if certain color trees are to be segmented. The prefilter value is the size of the discrete gaussian filter mask required to eliminate specific details and is preferably between 0 and 30.

Additionally, a seed threshold may be selected as the threshold value of a given local maximum corresponding to a RGB, luminance, or another color space, which is used as a seed point 53 from which to begin growing the low level segment according to a seeded region growing algorithm. The seed threshold in 8 bit images is between 0 and 256, preferably between 30 and 100. Alternatively, the seed threshold is another color parameter. Optionally, a cut ratio may also be used to filter out features on the image that will be considered background and left outside the remaining segments or individual tree crowns 52. The cut ratio is a threshold greyscale value of background, using the lowest greyscale value in the used color space that should be included in the segments. Values lower than this cut ratio will be considered as background and left outside the growing segments. The cut ratio in 8 bit images is between 0 and 256, preferably between 30 and 100. Alternatively, the cut ratio is another color parameter.

Figure 11:
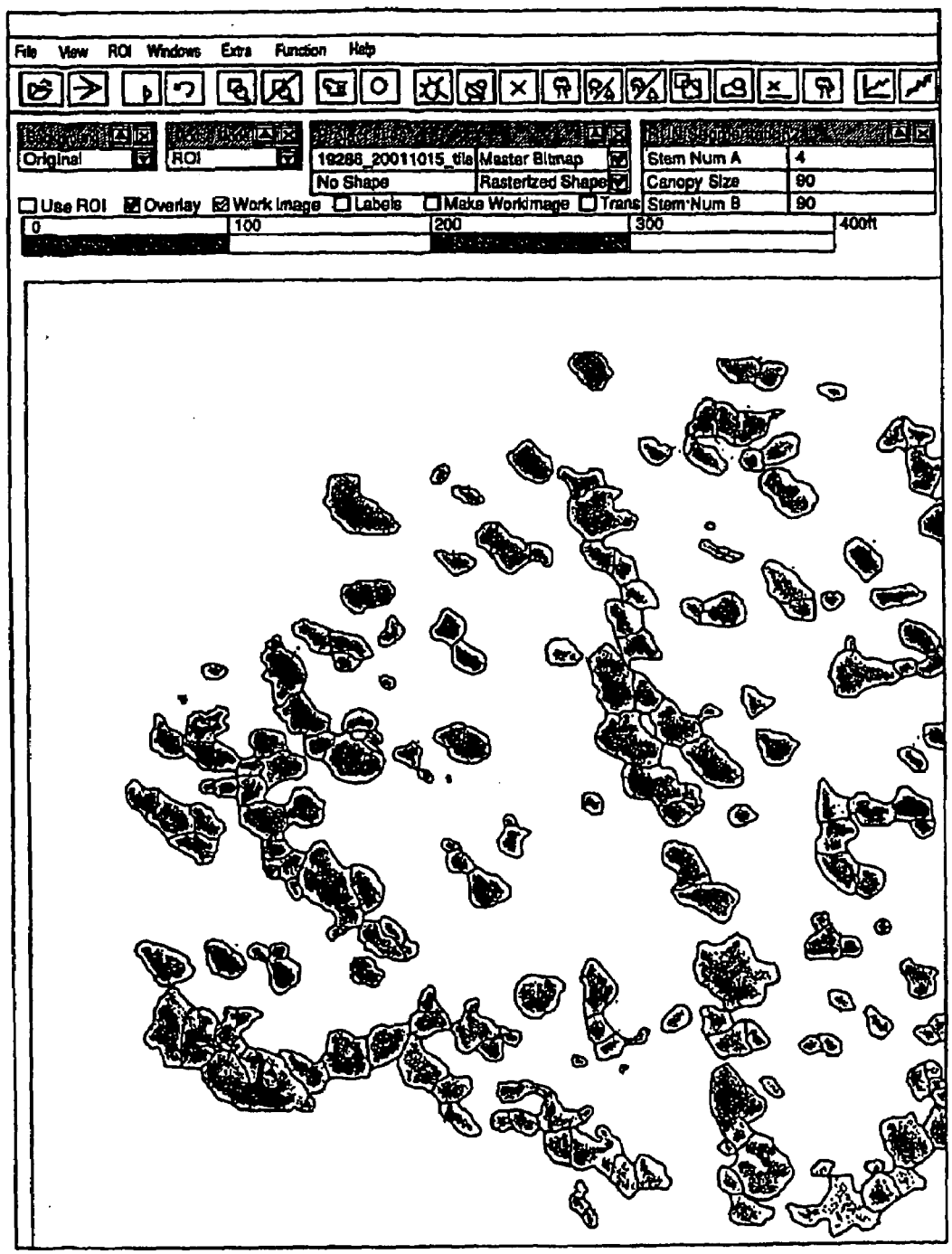
FIG. 11 illustrates low level tree crown segmentation using control parameters.

According to one embodiment of the present invention, seed points are placed at local maxims on the image that are brighter than a given threshold value 53. The brightness can be measured in luminance value of the image or some of the channels, or in a greyscale layer created using channel transformation based on channel information such as the calculated distance from a given color value in RGB, hue, saturation, or luminance-space and using that as the new greyscale value. This method makes it possible to find trees of a certain color and exclude other trees that have different color. Beginning from the seed points, individual low level segments are grown by adding pixels into the segments in the minimum change direction in the given greyscale layer, among all segments in the image 54. The added pixels must be next to the existing segment in any current phase. Adding pixels is continued until the given cut ratio parameter value in the given greyscale space is achieved or the entire image has been saturated and all pixels belong to a segment. Boundary lines are drawn around each resulting segment, such as a delineated tree crown 55. Tree crown segments from low level segmentation are illustrated on FIG. 11. This method of tree crown delineation generates complete boundaries around each tree crown, as opposed to partial boundaries, from which accurate and valuable physical tree data may be calculated.

Low level segmentation by seeded region growing and controlled filtering is performed according to the source code found in the appendix. It would be recognized, however, by those skilled in the art that the source code is provided for exemplary purposes and the invention is not limited by the code disclosed herein.

The resulting vector file containing low level segments, such as tree crowns, is displayed as an overlay using ordinary display means. FIG. 8 illustrates an example of the resulting crown boundaries, and crown boundaries are stored in vector file format 56 or a raster label map, such that the resulting layer can be viewed on the original input image and/or rectified to any map coordinate system.

Classification

Figure 12:
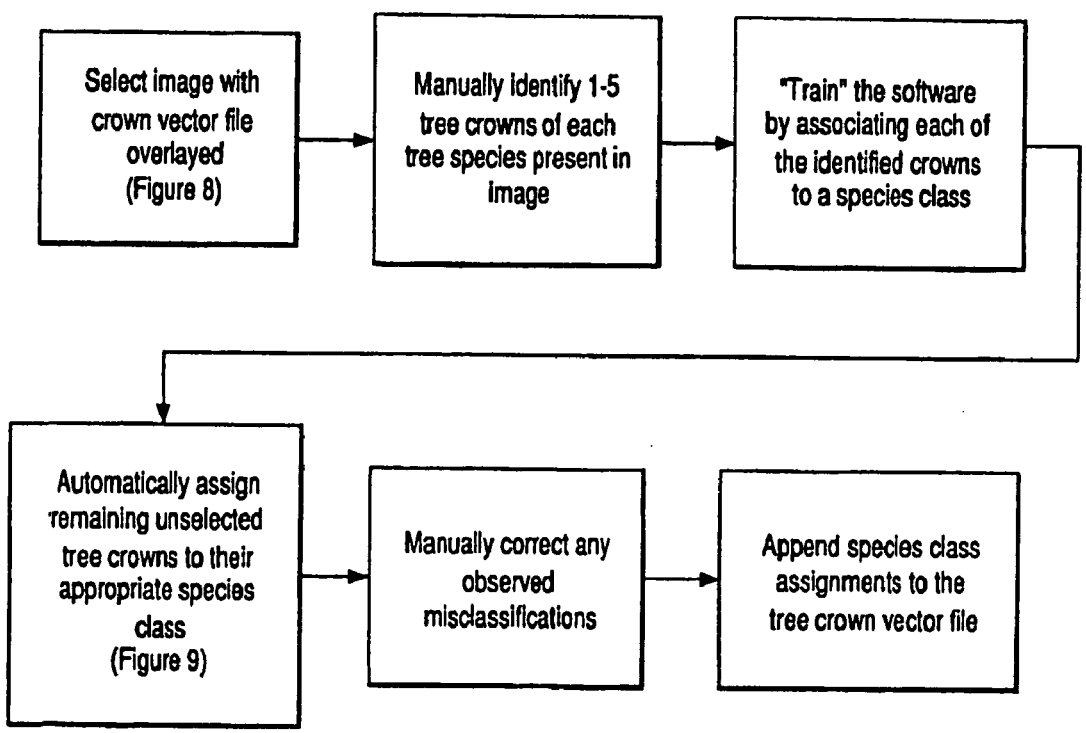
FIG. 12 is a species classification flow chart.
Figure 13:
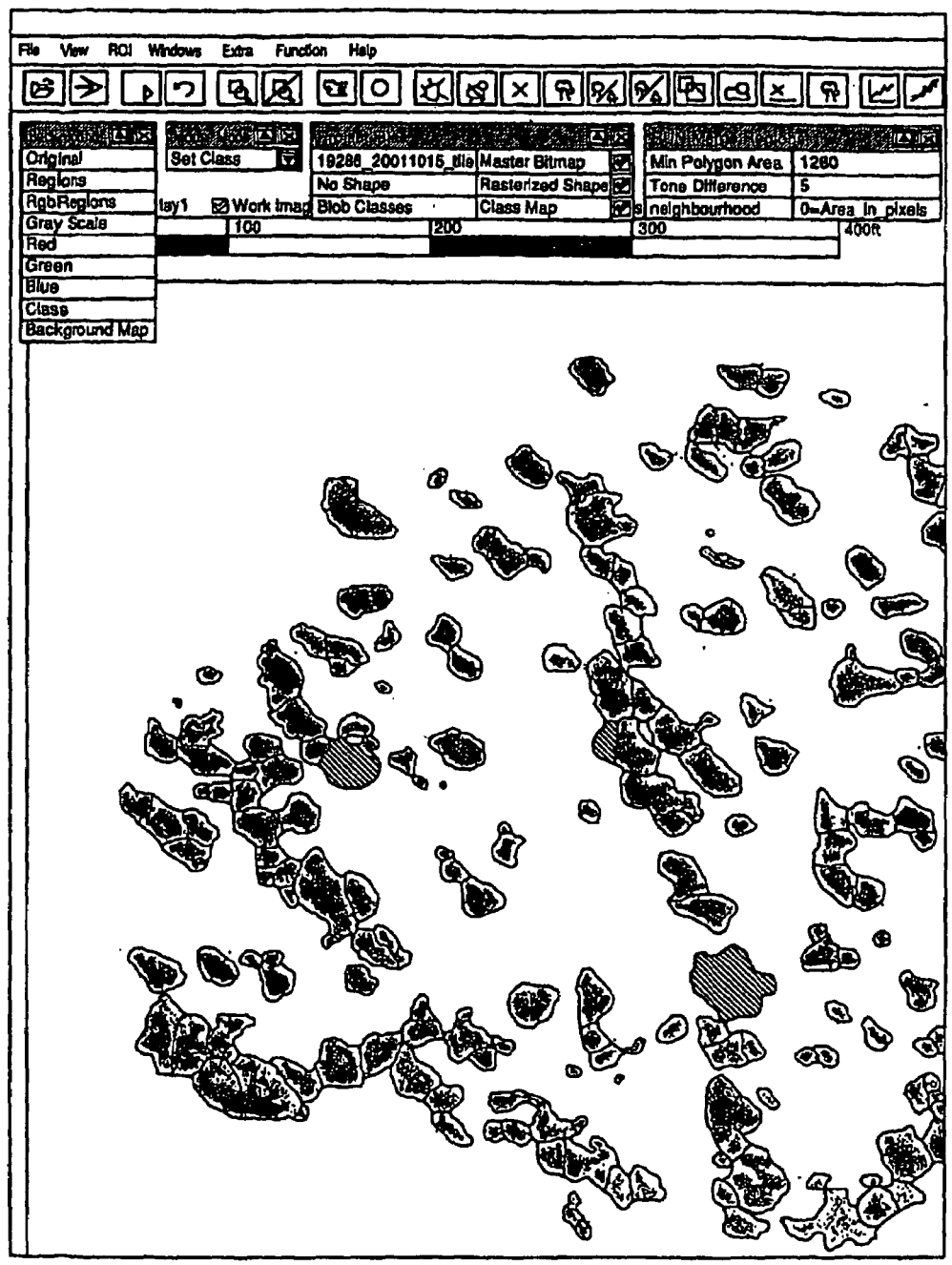
FIG. 13 illustrates a training procedure used in supervised tree crown species classification.

According to one aspect of the present invention, individual segments are classified according to species or class using supervised classification. Preferably, feature classification is performed on individual tree stands from a forestral digital image using a training procedure. Referring now to FIG. 12, a crown vector file overlay is selected 61. The user identifies tree crowns associated with specific tree species by manually selecting trees 62. Manual selection to create training sites, or user identified tree crowns, may be done by clicking on individual trees with a mouse or any other computer pointer device. The user identifies at least one tree crowns within a species, preferably 2–5 tree crowns. This training procedure 63 is illustrated in FIGS. 12 and 13 which depicts three trees of a given species that have been manually selected. The number of training sites to be selected per species or class depends on the homogeneity of the individual delineated feature to be classified. For example, greater color homogeneity within a tree species on a particular tree crown vector file requires fewer training sites for that species. The user identifies up to 5 species within the crown vector file, preferably 1 to 5 species, more preferably 1 to 3 species. For each species identified, tree segment color, shape or texture measures are calculated to characterize the species. Preferably, the average color value of the tree crown segment or center location of the tree crown segment is used to characterize the species.

Figure 14:
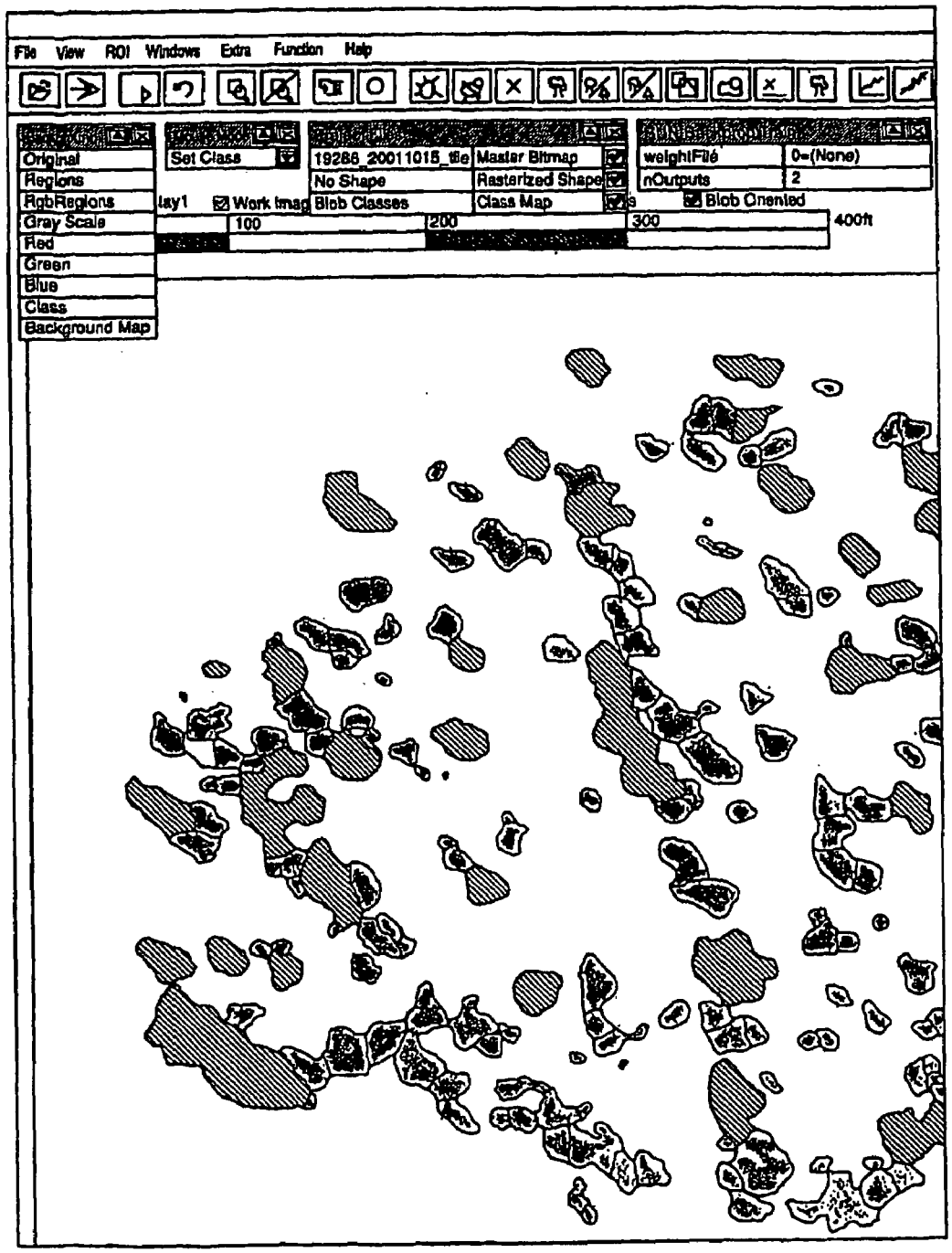
FIG. 14 illustrates computer assisted classification of unselected trees based on a training procedure and user selected training units.

Remaining unselected tree crowns that correspond to those feature values are recognized and classified accordingly 64, as shown in FIGS. 12 and 14. Classification is performed pursuant to any classification method known to one of ordinary skill in the art, preferably nearest neighborhood classification.

As indicated in FIG. 12, according to another embodiment of the invention, the user manually corrects the classification as necessary by manually classifying and/or reclassifying tree crowns based on manual observation of misclassifications 65.

The resulting classification information is stored in a vector file 66. Preferably, the species information is appended to the tree crown vector file.

Data Analysis

According to another aspect of the present invention, mathematical models are used to analyze additional attributes associated with segmented and classified features in aggregate segments. Preferably, classified tree crowns within a homogenous tree stand are used for analysis. Crown correlation models are based on data obtained through field measurements based on species specific variables including, but not limited to, actual field measurement of tree crown size, DBH, volume, form class, and height. Models are stored in a database or model file, e.g. in XML format. Table 1 illustrates the Norway Spruce Model, which may be commonly used in analysis of Appalachian regions:

TABLE 1

```
<xml>
  <modform version="2.0" fileref="19301_20011019_tile003.tif">
    <modgroups>
      <mgroup name="Models210801">
        <mclass name="IHC2906" diam="HMA11" height="HMA21" vol="HMA31" color="0"/>
        <mclass name="ASH" diam="ASH11" height="ASH21" vol="ASH31"/>
        <mclass name="Cherry" diam="Cherry11" height="Cherry21" vol="Cherry31" color="80FFFF"/>
        <mclass name="HMA" diam="HMA11" height="HMA21" vol="HMA31" color="4080FF"/>
        <mclass name="Poplar" diam="ASH11" height="Poplar21" vol="Poplar31" color="80FFFF"/>
        <mclass name="RedOak" diam="Redoak11" height="Redoak21" vol="Redoak31" color="FF"/>
        <mclass name="WhiteOak" diam="Whiteoak11" heiqht="Whiteoak21" vol="Whiteoak31" color="FFFFFF"/>
        <mclass name="RMA" diam="RMA11" height="RMA21" vol="RMA31" color="800080"/>
        <mclass diam="IHC2906" height="IHCOoakHght" vol="IHCHeight" name="" color="0"/>
      </mgroup>
    </modgroups>
    <models>
      <diameter>
        <model id="1" name="ASH11" formula="Square Root-X" inpunit1="ft2" outunit="inch">
          <param id="1" val="5.847"/>
          <param id="2" val="0.735"/>
        </model>
```

TABLE 1-continued

```
        <model id="1" name="Cherry11" formula="Square Root-X" inpunit1="ft2" outunit="inch">
          <param id="1" val="3.217"/>
          <param id="2" val="0.765"/>
        </model>
        <model id="1" name="HMA11" formula="Square Root-X" inpunit1="ft2" outunit="inch">
          <param id="1" val="3.192"/>
          <param id="2" val="0.69"/>
        </model>
        <model id="1" name="RMA11" formula="Square Root-X" inpunit1="ft2" outunit="inch">
          <param id="1" val="3.192"/>
          <param id="2" val="0.69"/>
        </model>
        <model id="1" name="Poplar11" formula="Square Root-X" inpunit1="ft2" outunit="inch">
          <param id="1" val="1.068"/>
          <param id="2" val="0.86"/>
        </model>
        <model id="1" name="Redoak11" formula="Square Root-X" inpunit1="ft2" outunit="inch">
          <param id="1" val="2.034"/>
          <param id="2" val="0.86"/>
        </model>
        <model id="1" name="Whiteoak11" formula="Square Root-X" inpunit1="ft2" outunit="inch">
          <param id="1" val="3.523"/>
          <param id="2" val="0.79"/>
        </model>
        <model id="1" name="IHC2906" formula="Naeslund" inpunit1="ft2" outunit="inch">
          <param id="1" val="1.651"/>
          <param id="2" val="0.2006"/>
          <param id="3" val="0.0000"/>
        </model>
        <model id="1" name="IHCoak" formula="Square Root-X" inpunit1="ft2" outunit="inch">
          <param id="1" val="21.9397"/>
          <param id="2" val="3.1726"/>
          <param id="3" val="0.00000"/>
        </model>
      </diameter>
      <height>
        <model id="1" name="ASH21" formula="Linear" inpunit1="inch" outunit="ft" xmin1="3">
          <param id="1" val="43.182"/>
          <param id="2" val="1.882"/>
        </model>
        <model id="1" name="Cherry21" formula="Linear" inpunit1="inch" outunit="ft" xmin1="3">
          <param id="1" val="27.021"/>
          <param id="2" val="2.274"/>
        </model>
        <model id="1" name="HMA21" formula="Linear" inpunit1="inch" outunit="ft" xmin1="3">
          <param id="1" val="33.074"/>
          <param id="2" val="1.946"/>
        </model>
        <model id="1" name="RMA21" formula="Linear" inpunit1="inch" outunit="ft" xmin1="3">
          <param id="1" val="33.074"/>
          <param id="2" val="1.946"/>
        </model>
        <model id="1" name="Poplar21" formula="Linear" inpunit1="inch" outunit="ft" xmin1="3">
          <param id="1" val="43.41"/>
          <param id="2" val="2.3"/>
        </model>
        <model id="1" name="Redoak21" formula="Logarithmic-X" inpunit1="inch" outunit="ft" xmin1="3">
          <param id="1" val="1.533"/>
          <param id="2" val="22.236"/>
        </model>
        <model id="1" name="Whiteoak21" formula="Linear" inpunit1="inch" outunit="ft" xmin1="3">
          <param id="1" val="36.718"/>
          <param id="2" val="1.5"/>
        </model>
```

TABLE 1-continued

```
        <model id="1" name="IHC2906" formula="Linear"
inpunit1="inch" outunit="ft" xmin1="3">
            <param id="1" val="28.2382"/>
            <param id="2" val="1.5075"/>
            <param id="3" val="0.0000"/>
        </model>
        <model id="1" name="IHCOoakHght" formula="Naeslund"
inpunit1="inch" outunit="ft" xmin1="3">
            <param id="1" val="2.7434"/>
            <param id="2" val="0.1947"/>
            <param id="3" val="0.0000"/>
        </model>
    </height>
    <volume>
        <model id="2" name="ASH31" formula="Square Root-Y"
inpunit1="inch" inpunit2="ft" outunit="bf" xmin1="3">
            <param id="1" val="-16.058"/>
            <param id="2" val="1.5"/>
        </model>
        <model id="2" name="Cherry31" formula="Square Root-Y"
inpunit1="inch" inpunit2="ft" outunit="bf" xmin1="3">
            <param id="1" val="-13.161"/>
            <param id="2" val="1.427"/>
        </model>
        <model id="2" name="HMA31" formula="Square Root-Y"
inpunit1="inch" inpunit2="ft" outunit="bf" xmin1="3">
            <param id="1" val="-13.598"/>
            <param id="2" val="1.49"/>
        </model>
        <model id="2" name="RMA31" formula="Square Root-Y"
inpunit1="inch" inpunit2="ft" outunit="bf" xmin1="3">
            <param id="1" val="-13.598"/>
            <param id="2" val="1.49"/>
        </model>
        <model id="2" name="Poplar31" formula="Square Root-Y"
inpunit1="inch" inpunit2="ft" outunit="bf" xmin1="3">
            <param id="1" val="-16.037"/>
            <param id="2" val="1.575"/>
        </model>
        <model id="2" name="Redoak31" formula="Square Root-Y"
inpunit1="inch" inpunit2="ft" outunit="bf" xmin1="3">
            <param id="1" val="-13.3"/>
            <param id="2" val="1.449"/>
        </model>
        <model id="2" name="Whiteoak31" formula="Square Root-Y"
inpunit1="inch" inpunit2="ft" outunit="bf" xmin1="3">
            <param id="1" val="-13.008"/>
            <param id="2" val="1.42"/>
        </model>
        <model id="2" name="undefined" formula="Square Root-Y"
inpunit1="inch" inpunit2="ft" outunit="bf" xmin1="3">
            <param id="1" val="-13.3"/>
            <param id="2" val="1.38"/>
        </model>
        <model id="2" name="IHCHeight" formula="Square Root-Y"
inpunit1="inch" inpunit2="ft" outunit="bf" xmin1="3">
            <param id="1" val="-0.8110"/>
            <param id="2" val="0.0525"/>
            <param id="3" val="0.0000"/>
        </model>
    </volume>
</models>
<formulas>
    <formula id="1" name="Naeslund">
        <add>
            <div>
                <mul>
                    <var inx="1"/>
                    <var inx="1"/>
                </mul>
                <mul>
                    <add>
                        <coeff inx="1"/>
                        <mul>
                            <coeff inx="2"/>
                            <var inx="1"/>
                        </mul>
                    </add>
                    <add>
                        <coeff inx="1"/>
                        <mul>
                            <coeff inx="2"/>
                            <var inx="1"/>
                        </mul>
                    </add>
                </mul>
            </div>
            <coeff inx="3"/>
        </add>
    </formula>
    <formula id="2" name="sqrtLinear">
        <add>
            <mul>
                <coeff inx="1"/>
                <sqrt>
                    <var inx="1"/>
                </sqrt>
            </mul>
            <coeff inx="2"/>
        </add>
    </formula>
    <formula id="2" name="Laasasenaho2">
        <mul>
            <coeff inx="1"/>
            <pow>
                <var inx="1"/>
                <coeff inx="2"/>
            </pow>
            <pow>
                <coeff inx="3"/>
                <var inx="1"/>
            </pow>
            <pow>
                <var inx="2"/>
                <coeff inx="4"/>
            </pow>
            <pow>
                <add>
                    <var inx="2"/>
                    <coeff inx="6"/>
                </add>
                <coeff inx="5"/>
            </pow>
        </mul>
    </formula>
    <formula id="1" name="Linear">
        <add>
            <coeff inx="1"/>
            <mul>
                <var inx="1"/>
                <coeff inx="2"/>
            </mul>
        </add>
    </formula>
    <formula id="1" name="Multiplicative">
        <mul>
            <coeff inx="1"/>
            <pow>
                <var inx="1"/>
                <coeff inx="2"/>
            </pow>
        </mul>
    </formula>
    <formula id="1" name="Reciprocal-Y">
        <inv>
            <add>
                <coeff inx="1"/>
                <mul>
                    <var inx="1"/>
                    <coeff inx="2"/>
                </mul>
            </add>
        </inv>
    </formula>
```

TABLE 1-continued

```
<formula id="1" name="Exponential">
    <exp>
        <add>
            <coeff inx="1"/>
            <mul>
                <var inx="1"/>
                <coeff inx="2"/>
            </mul>
        </add>
    </exp>
</formula>
<formula id="1" name="Reciprocal-X">
    <add>
        <coeff inx="1"/>
        <div>
            <coeff inx="2"/>
            <var inx="1"/>
        </div>
    </add>
</formula>
<formula id="1" name="Logarithmic-X">
    <add>
        <coeff inx="1"/>
        <mul>
            <coeff inx="2"/>
            <log>
                <var inx="1"/>
            </log>
        </mul>
    </add>
</formula>
<formula id="1" name="Square Root-X">
    <add>
        <coeff inx="1"/>
        <mul>
            <coeff inx="2"/>
            <sqrt>
                <var inx="1"/>
            </sqrt>
        </mul>
    </add>
</formula>
<formula id="1" name="Square Root-Y">
    <pow2>
        <add>
            <coeff inx="1"/>
            <mul>
                <coeff inx="2"/>
                <var inx="1"/>
            </mul>
        </add>
    </pow2>
</formula>
<formula id="1" name="2-Reciprocal">
    <inv>
        <add>
            <coeff inx="1"/>
            <div>
                <coeff inx="2"/>
                <var inx="1"/>
            </div>
        </add>
    </inv>
</formula>
<formula id="1" name="S-Curve">
    <exp>
        <add>
            <coeff inx="1"/>
            <div>
                <coeff inx="2"/>
                <var inx="1"/>
            </div>
        </add>
    </exp>
</formula>
```

TABLE 1-continued

```
<formula id="1" name="Polynomical">
    <add>
        <coeff inx="3"/>
        <mul>
            <coeff inx="1"/>
            <var inx="1"/>
        </mul>
        <mul>
            <coeff inx="2"/>
            <pow2>
                <var inx="1"/>
            </pow2>
        </mul>
    </add>
</formula>
</formulas>
</modform>
```

Any model that is commonly known in the art may be used to generate species specific data based on tree crown area. Examples of models commonly known in the art include Naeslund and Laasasenaho2.

Any variable may be included in the model, including but not limited to species, DBH, form class, tree quality or value. Models may be updated and altered depending on the species and region, and new models incorporated at any time into the model database.

Figure 15:
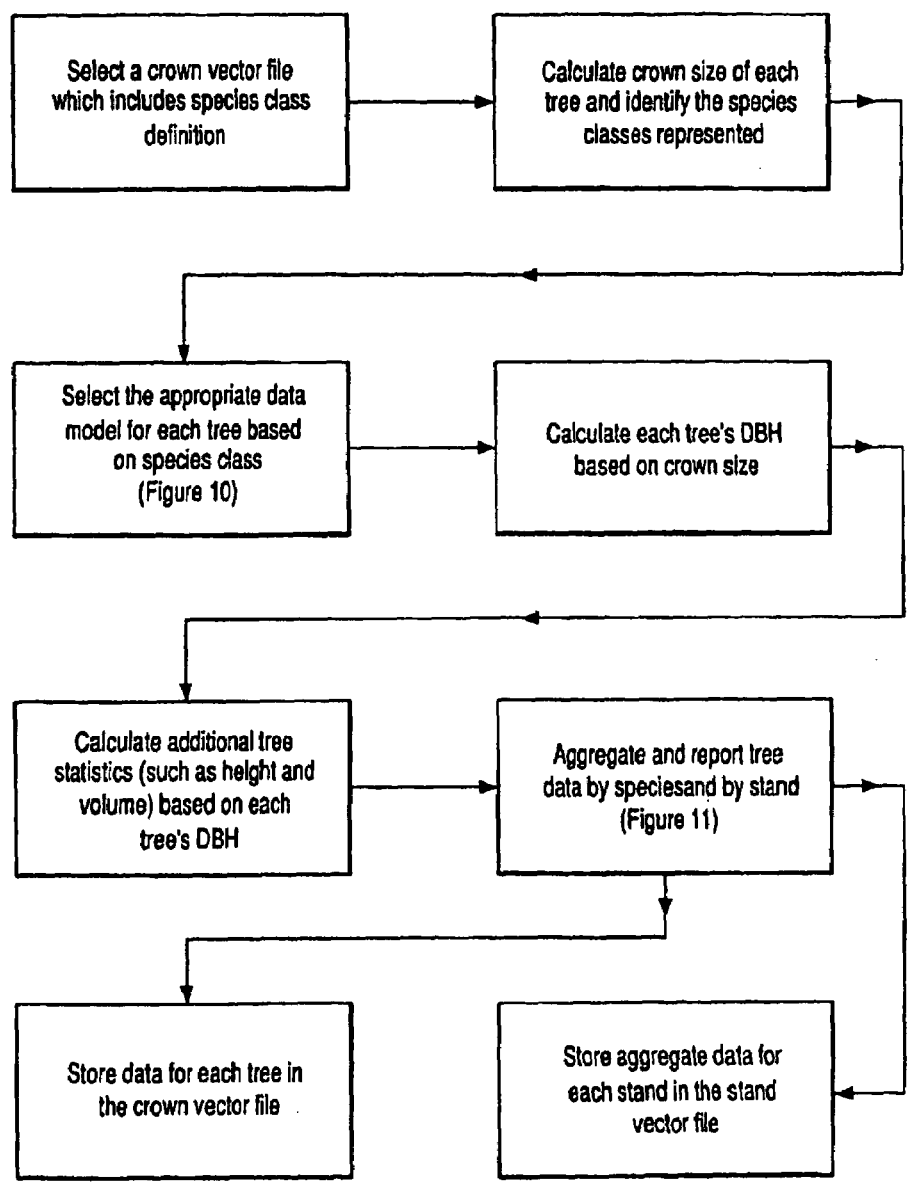
FIG. 15 is a data analysis flow chart.
Figure 16:
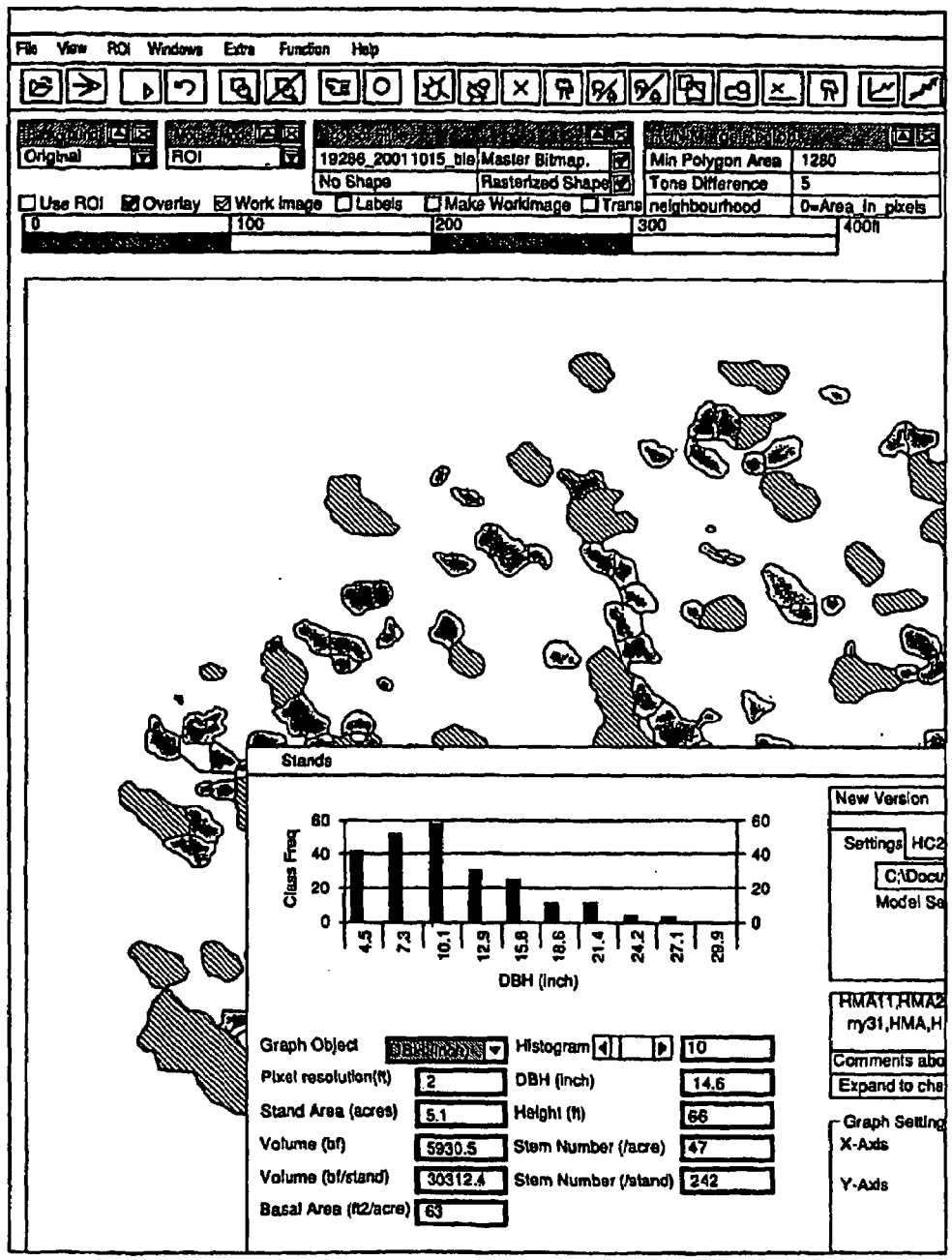
FIG. 16 illustrates a video monitor displayed data and image file containing data analysis results.

Referring now to FIG. 15, according to one embodiment of the present invention, the user selects a crown vector file for analysis 71, calculates the crown size for each tree 72, and selects an appropriate data model 73 that most closely represents the species depicted in the crown vector file and geographic location of the original input image. Using the model, each tree's DBH is calculated based on crown size 74. Additional aggregate tree stand and individual tree data is thereafter calculated, such as height and volume based on DBH 75, total breast height diameter distribution of trees, tree height distribution, tree stem number, tree stem number per hectare, total tree stem volume, and histogram distribution of trees by species, such histogram which can be adjusted by putting upper and lower limits on tree stem size 76. The reported data is displayed on ordinary display means, as illustrated in FIG. 16. Examples of physical data calculations are:

Diameter breast height=$(6.043*sqrt(A))+1.283$;

Tree Height=$div((A*A),((2.09000+(0.14050*A))*(2.09000+(0.14050*A))))+1.30000$;

Stem Volume=$0.000022927*pow(A,1.91505)*pow(0.99146,A)*pow(B,2.82541)*pow((B-1.3),-1.53547)$;

where A=tree crown area.

According to another embodiment of the present invention, batch modeling of delineated and classified features is performed using pre-selected models.

As indicated in FIG. 15, the resulting data is stored in vector file format. Preferably, the aggregate stand data is stored on the stand attribute table that is associated with the stand vector file generated according to the stand segmentation aspect of the current invention 78.

Additionally, the tree data may be stored on the attribute table in the crown vector file 77. According to one embodiment of the present method, statistical information is also generated based on the modeling results, which includes, but is not limited to valuation of timber, estimation of property values based on public tax and terrain slope information, over or under-valuation of property by comparing market value to timber valuation, and estimation of vegetation growth rates and agricultural production. For example, the value of timber in a particular tree stand is calculated using the tree stem volume calculated from crown area, and public market value information based on species. Total volume of species used for this determination can be limited depending on the size of the tree as specified by the user. The market value may be obtained from public information or may be user input.

Another example of valuation information that can be generated from a digital image is orchard output. For example, where crown areas are captured from a digital image of a grove of orange trees, an estimate of the oranges produced by the individual trees can be calculated, e.g., by applying an empirically based statistical classification model where crown areas of area A1 produce O1 oranges, A2 produce O2 oranges, where A(x) is a range of areas, and O(x) is average orange production for areas A(x).

Statistical data is stored in the corresponding crown and/or stand vector file 77, 78 as indicated in FIG. 15, and can be displayed by ordinary display means.

It is recognized that the scope of the present invention includes application of the current method to other empirical models that are based on species data, such as fruit and juice production from fruit baring trees, carbon production, etc and that the present method is not limited to any specific embodiment presented herein.

EXAMPLE 1

A 2 foot digital ortho-rectified, color-balanced image in TIFF format was taken of a 12 square mile forested area in Nicholas County, West Virginia. The image was taken in RGB true color, and was taken in the fall when leaves are in senescence. Stand segmentation was performed using seeded region growing. Tree crowns were captured using segmentation, and filtering parameters used to eliminate undesirable details were a prefilter value of 4, a seed threshold of 90, and a cut ratio of 90. Species were classified according to supervised classification based on the teaching method. Three trees were selected per species. Three species were selected and identified using nearest neighborhood classification: poplar, red maple and red oak.

For data analysis, a model was selected for each of the three species based on data from 200 field measurements of different sized trees in Pennsylvania. The resulting data was displayed and is illustrated in FIG. 16.

EXAMPLE 2

A stand area of 24 acres was selected south of Dugway Rd, in Madison County, New York, Tax Map Number 148.-1-7. Low level segmentation was performed to delineate tree crowns, and species classification and tree crown data analysis were performed to determine tree species and total tree stem volume in board-feet. A total of 93,402 board-feet was calculated based on only trees of DBH greater than 12 inches. Trees with DBH greater than 25 in. were not used in the data analysis.

Species classification resulted in 85% Hard Maple, 13% undefined, and 2% Cherry. The Norway Spruce Model was selected based on the species present in the image. The following table illustrates a breakdown of tree stem volume based on the total number of trees per DBH:

| DBH (in.) | Tree Count | Total Volume/DBH (Bf) |
|---|---|---|
| <12 | 0 | 0 |
| 12 | 154 | 2952 |
| 13 | 167 | 5504 |
| 14–15 | 293 | 18374 |
| 16–17 | 197 | 23001 |
| 18–19 | 107 | 19339 |
| 20–21 | 63 | 16496 |
| 22–23 | 18 | 5860 |
| 24–25 | 5 | 1876 |

EXAMPLE 3

A stand area of 18 acres was selected in Madison County, NY, East of Cazenoia, Moraine Road, Tax Map Number 96-2-1. Low level segmentation was performed to delineate tree crowns, and species classification and tree crown data analysis were performed to determine tree species and total tree stem volume in board-feet. A total of 25,629 board-feet was calculated based on only trees of DBH greater than 14 inches.

Species classification resulted in 45% Hard Maple, 15% Cherry, 4% Red Maple, and 36% undefined. The Norway Spruce Model was selected based on the species present in the image. The following table illustrates a breakdown of tree stem volume based on the total number of trees per DBH:

| DBH (in.) | Tree Count | Total Volume/DBH (Bf) |
|---|---|---|
| 14–15 | 64 | 9832 |
| 16–17 | 87 | 10027 |
| 18–19 | 22 | 4039 |
| 20–21 | 5 | 1374 |
| 22–23 | 1 | 357 |
| 24–25 | 0 | 0 |
| 26–27 | 0 | 0 |
| 28–29 | 0 | 0 |
| 30–31 | 0 | 0 |
| 32–33 | 0 | 0 |
| 34+ | 0 | 0 |

Timber value was then calculated using the total tree stem volume per species in Doyle and stump prices per 1000 Doyle. The following table illustrates the valuation data generated using the present method:

| Species | Volume (Doyle) | Stump Price (per 1000 Doyle) | Timber Value |
|---|---|---|---|
| Hard Maple | 11,533 | $629.00 | $7,254.26 |
| Cherry | 3,844 | $2,234.00 | $8,587.50 |
| Red Maple | 1,025 | $309.00 | $316.73 |
| Other | 9,226 | $131.00 | $1,208.61 |
| TOTAL | 25,628 | | $17,367.08 |

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

What is claimed is:

1. A method for classifying and analyzing a digital image containing aggregate and individual features, said method comprising:
providing a digital image;
segmenting the digital image to produce a aggregate image file, said aggregate image file comprising a first series of polygons with boundary lines;
correcting said first series of polygons by merging adjacent homogenous ones of said first series of polygons to create a larger polygon;
segmenting individual features within said larger polygons;
classifying individual features;
analyzing individual features;
wherein correcting said first series of polygons comprises unsupervised and manual correction;
wherein said manual correction comprises identifying boundary lines of first series polygon segments and merging said segments; and
wherein identifying said boundary lines comprises drawing a line or polygon to merge adjacent ones of said first series polygons.

2. The method of claim 1, wherein said aggregate features are tree stands.

3. The method of claim 1, wherein said individual features are tree crowns.

4. The method of claim 1, wherein said aggregate segmentation comprises growing aggregate segments by placing a seed point at a pixel located at the center of a homogenous area located on the digital image and growing homogenous tree stands based on gradient values image pixels surrounding the seed point pixel.

5. The method of claim 1, wherein said unsupervised correction is performed by adjusting an unsupervised aggregate segmentation algorithm to produce said larger polygons.

6. The method of claim 1, wherein said individual feature segmentation step comprises filtering distractions from said digitized input image by applying control parameters and seeded region growing of homogenous areas within a selected aggregate segment.

7. The method of claim 6, wherein said control parameters comprises a prefiltering parameter, a seed point threshold, and a cut ratio.

8. The method of claim 7, wherein said prefiltering parameter is the size of a discrete gaussian filter mask between 0 and 30.

9. The method of claim 7, wherein said seed point threshold is a given local maximum value including RGB, luminance, color infrared or some other color space.

10. The method of claim 9, wherein said seed point threshold is between 0 and 256 or is some other color value parameter.

11. The method of claim 7, wherein the cut ratio is a threshold greyscale value between 0 and 256 or some other color value parameter.

12. The method of claim 1, wherein said classification comprises supervised classification.

13. The method of claim 12, wherein said supervised classification further comprises identifying class or species of individual features and using a training procedure to classify all individual features based on the identified individual features.

14. The method of claim 1, wherein said analysis further comprises selecting a model based on said class or species of said individual features and applying said model to the classified individual features.

15. A computer assisted method of timber inventory analysis, said method comprising:
providing a digital image of a forested area;
segmenting tree stands within said digital image, said segmenting comprising performing a gradient image analysis on said digital image to identify homogenous areas, selecting seed points in the center of each homogenous area, performing seeded region growing within each homogenous area based on gradient values surrounding said seed points, correcting segmented tree stands by merging adjacent homogenous tree stands to create a larger homogenous tree stand segment, and saving resulting tree stand segments as vector files;
segmenting tree crowns within said stand segment vector files, said method comprising selecting an image with a stand segment vector file overlaid, filtering the digital image to eliminate unwanted detail, selecting seed points at the center of each tree crown present within the selected stand segment vector file, performing seeded region growing within each tree crown based on pixel values surrounding said seed points, drawing boundary lines around each segmented tree crown, and saving the resulting crown boundaries as vector files;
classifying tree species of said segmented tree crowns, said method comprising selecting an image with a crown vector file overlaid, manually identifying tree crowns of tree species present within the image, assigning species to the remaining unidentified tree crowns, and appending said species assignments to the crown vector file; and
analyzing tree crown data, said method comprising selecting a crown vector file which includes species assignments of tree crowns, calculating the tree crown area of each tree, selecting a data model, calculating tree specific parameters based on the tree crown area and the data model, and storing resulting data in a vector file.

16. The method of claim 15, wherein said digital image has a resolution of about 0.7 to about 1.5 meters.

17. The method of claim 15, wherein said digital image has a resolution of about 0.2 to about 0.7 meters.

18. The method of claim 15, wherein said tree stand segmentation further comprises the step of subsampling the image to 2–5 meters per pixel.

19. The method of claim 15, wherein said tree stand segmentation further comprises the step of prefiltering the image to eliminate unnecessary details in the image.

20. The method of claim 15, wherein said tree stand segmentation is performed by an automatic segmentation algorithm.

21. The method of claim 15, wherein said tree stand segmentation further comprises seeded region growing based on pixel values.

22. The method of claim 15, wherein said tree stand segmentation further comprises the step of automatic unsupervised segmentation adjustment using the automatic segmentation algorithm.

23. The method of claim 15, wherein said merging of adjacent homogenous segmented tree stands further comprises manual segmentation adjustment by drawing a line or polygon to merge said adjacent homogenous tree stands.

24. The method of claim 15, wherein said tree crown segmentation further comprises filtering the digital image by assigning values to control parameters to eliminate unwanted detail from the selected image with stand vector file overlay.

25. The method of claim 15, wherein said filtering includes a prefiltering parameter, a seedpoint threshold, and a cut ratio.

26. The method of claim 15, wherein said tree crown segmentation further comprises stopping seeded region growing when all gradient values above a cut ratio filtering parameter are selected and all gradient values below the cut ratio are excluded from said tree crown segments.

27. The method of claim 15, wherein said tree crown segmentation further comprises seeded region growing based on gradient values.

28. The method of claim 15, wherein said tree crown segmentation further comprises stopping seeded region growing when all pixel values above a cut ratio are selected and all gradient values below the cut ratio are excluded from said tree crown segments.

29. The method of claim 15, wherein said tree species classification further comprises identification of 1 to 5 tree species.

30. The method of claim 15, wherein said tree species classification further comprises a training procedure to assign species to unidentified tree crowns based on the manual identification.

31. The method of claim 30, wherein said manual identification comprises identification of up to 5 tree crowns per species.

32. The method of claim 30, wherein said manual identification comprises identification of 2–3 tree crowns per species.

33. The method of claim 15, wherein said classification further comprises supervised nearest neighborhood classification.

34. The method of claim 15, wherein said classification is manually corrected.

35. The method of claim 15, wherein said tree crown data analysis further comprises selecting a model based on the species classified within the selected crown vector file.

36. The method of claim 15, wherein tree crown data analysis further comprises generation of diameter breast height per tree and for the entire stand segment, volume per tree and for the entire stand segment, and height per tree.

37. The method of claim 15, wherein tree crown data analysis further comprises generation of timber value of each classified species within the selected stand segment, and timber value of the entire stand segment.

38. The method of claim 15, wherein tree crown data analysis further comprises storage of the resulting data for each tree in the crown vector file.

39. The method of claim 15, wherein tree crown data analysis further comprises storage of the resulting data for the entire stand segment in the stand vector file.

* * * * *